US012486412B2

(12) United States Patent
Dean et al.

(10) Patent No.: US 12,486,412 B2
(45) Date of Patent: Dec. 2, 2025

(54) POLYESTERS, POLYMER COMPOSITIONS, AND METHODS OF USING THEREOF

(71) Applicants: Ohio State Innovation Foundation, Columbus, OH (US); UNIVERSITY OF SAO PAULO, São Paulo (BR)

(72) Inventors: David Dean, Columbus, OH (US); Luiz Henrique Catalani, São Paulo (BR)

(73) Assignees: Ohio State Innovation Foundation, Columbus, OH (US); University of Sao Paulo, São Paulo (BR)

( * ) Notice: Subject to any disclaimer, the term of this patent is extended or adjusted under 35 U.S.C. 154(b) by 955 days.

(21) Appl. No.: 17/287,917

(22) PCT Filed: Oct. 25, 2019

(86) PCT No.: PCT/US2019/058207
§ 371 (c)(1),
(2) Date: Apr. 22, 2021

(87) PCT Pub. No.: WO2020/087035
PCT Pub. Date: Apr. 30, 2020

(65) Prior Publication Data
US 2021/0380826 A1 Dec. 9, 2021

Related U.S. Application Data

(60) Provisional application No. 62/750,665, filed on Oct. 25, 2018.

(51) Int. Cl.
| C09D 11/104 | (2014.01) |
| B29C 64/124 | (2017.01) |
| B29K 71/00 | (2006.01) |
| B29K 105/00 | (2006.01) |
| B29K 509/02 | (2006.01) |
| B33Y 70/00 | (2020.01) |
| C07D 493/04 | (2006.01) |
| C08G 63/553 | (2006.01) |
| C08K 3/22 | (2006.01) |
| C08K 5/132 | (2006.01) |
| C08K 13/02 | (2006.01) |
| C09D 11/037 | (2014.01) |

(52) U.S. Cl.
CPC ............ C09D 11/104 (2013.01); B33Y 70/00 (2014.12); C07D 493/04 (2013.01); C08G 63/553 (2013.01); C08K 13/02 (2013.01); C09D 11/037 (2013.01); B29C 64/124 (2017.08); B29K 2071/00 (2013.01); B29K 2105/0032 (2013.01); B29K 2509/02 (2013.01); C08K 2003/2241 (2013.01); C08K 5/132 (2013.01)

(58) Field of Classification Search
CPC .. C09D 11/104; C09D 11/037; C07D 493/04; C08G 63/553; B29C 64/124; B29K 2071/00; B29K 2105/0032; B29K 2509/02; C08K 5/132; C08K 2003/2241; A61L 71/06; A61L 17/015; A61L 27/18; A61L 27/50; A61L 27/507; A61L 27/54
See application file for complete search history.

(56) References Cited

U.S. PATENT DOCUMENTS

| 7,747,305 | B2 | 6/2010 | Dean et al. |
| 9,688,023 | B2 | 6/2017 | Dean et al. |
| 2009/0253809 | A1 | 10/2009 | Gomurashvili et al. |
| 2011/0269908 | A1 | 11/2011 | Jansen et al. |
| 2015/0314039 | A1 | 11/2015 | Dean et al. |
| 2015/0353673 | A1 | 12/2015 | Shiraki et al. |
| 2017/0145153 | A1 | 5/2017 | Jacquel et al. |
| 2017/0306087 | A1* | 10/2017 | Cogordan ............ C08G 63/672 |
| 2018/0126653 | A1 | 5/2018 | Dean et al. |

FOREIGN PATENT DOCUMENTS

| CN | 103044669 A | 4/2013 |
| CN | 103044669 B | 2/2015 |
| WO | 2014/085809 | 6/2014 |

OTHER PUBLICATIONS

Ibert et al., machine English translation of WO 2014/147340 (Year: 2014).*
Jasinska et al. "Unsaturated, biobased polyesters and their cross-linking via radical copolymerization", Journal of Polymer Science Part A: Polymer Chemistry, vol. 48, Issue 13, pp. 2885-2895 (Year: 2010).*
Zakharova et al. "Bio-based aliphatic polyesters from aliphatic diacids and bicyclic alditols: A comparative study" Avances en Materiales Poliméricos, XIV Reunión del Grupo Especializado de Polímeros, p. 241-242 (Year: 2016).*
International Search Report and Written Opinion issued by the International Searching Authority (ISA/US) in PCT Application No. PCT/US2019/058207 on Apr. 23, 2020. 10 pages.
Zakharova, Elena, et al. "Sugar-based bicyclic monomers for aliphatic polyesters: a comparative appraisal of acetalized alditols and isosorbide." Designed monomers and polymers 20.1 (2017): 157-166.
International Preliminary Report on Patentability issued for Application No. PCT/US2019/058207, dated May 6, 2021.

(Continued)

Primary Examiner — Jessica M Roswell
(74) Attorney, Agent, or Firm — Meunier Carlin & Curfman LLC

(57) ABSTRACT

Provided herein are polyesters that comprise (i) monomer units derived from sugar-based bicyclic diol; (ii) monomer units derived from an unsaturated aliphatic diacid; and (iii) monomer units derived from a saturated aliphatic diacid. The monomer units derived from the ethylenically unsaturated aliphatic diacid can be present in an amount of from greater than 0 mole % to 40 mole % of the polyester. These polyesters can be formed into articles using additive manufacturing methods. The resulting articles can be biocompatible, resorbable over a span of from 3 months to 12 months following implantation in the human body, and can exhibit desirable mechanical properties for applications, including porosity and elasticity.

32 Claims, 27 Drawing Sheets

(56) References Cited

OTHER PUBLICATIONS

Extended European Search Report issued for Application No. 19875565.4, dated Apr. 22, 2022.

Naves, Alliny F. et al. "Enzymatic Syntheses of Unsaturated Polyesters Based on Isosorbide and Isomannide". Journal of Polymer Science, São Paulo, 2013, 51, 3881-3891.

Dean, David et al. "Continuous Digital Light Processing (cDLP): Highly Accurate Additive Manufacturing of Tissue Engineered Bone Scaffolds". Virtual and Physical Prototyping, Ohio, 2012, 7(1), 13-24.

Larsen, M.; Mishra, R.; Miller, M.; Dean D. Craniofacial and Dental Tissue. In (Lijie Grace Zhang and John Fisher, Eds.): 3D Bioprinting and Nanotechnology in Tissue Engineering and Regenerative Medicine, Academic Press (Elsevier), Waltham, MA, 2015, 191.

Pires, A. L.; Bierhalz, A.C.K.; Moraes, A.M. Biomateriais: tipos, aplicações e mercados. Química Nov. 2015, 38(7), 957-971. English Abstract.

Marois Y.; Guidoin, R. Biocompatilibity of poliurethanes. Madame Curie, 2000-2013. Landes Bioscience.

Beldi, M. et al. "Characterization of cyclic and non-cyclic poly-(ether-urethane)s bio-based sugar diols by a combination of MALDI-TOF and NMR". European Polymer Journal, 2007, 43(8), 3415-3433.

J. C. Krantz, C. J. Carr, "Studies in Diuresis with Isomannide." Sugar Alcohols XVIII. Experimental Biology and Medicine. 1938, 39, 577-581.

M. Okada, Y. Okada, K. Aoi. "Synthesis and degradabilies of polyesters from 1,4:3,6-dianhydrohexitols and aliphatic dicarboxylic acids", Journal of. Polymer Science Part A: Polymer Chemistry 1995, 33, 2813-2820.

D. Juais, A. F. Naves, R. A. Gross, L. H. Catalani, "Isosorbide Polyesters from Enzymatic Catalysis". Macromolecules 2010, 43, 10315-10319.

Dhake, Kishor P.; Qureshi, Ziyauddin S.; Singhal, Rekha S.; Bhanage, Bhalchandra M. "Candida antarctica lipase B-catalyzed synthesis of acetamides using [BMIm (PF 6)] as a reaction medium". Tetrahedron Letters. 2009, 50(23), 2811-2814.

Stansbury, Jeffrey W.;Idacavage, Mike J. "3D printing with polymers: Challenges among expanding options and opportunities". Dental Materials, 2016, 32(1), 54-64.

Fisher, John P; Dean, David;Mikos, Antonios "Photocrosslinking characteristics and mechanical properties of diethyl fumarate/poly(propylene fumarate) biomaterials." Biomaterials, 2002,. 23(22), 4333-4343.

Wang, S.; Lichun Lu, L.; Gruetzmacher, J.A.; Currier, B.L.; Yaszemski, M.J. "A Novel Injectable Polymeric Biomaterial Poly(propylene fumarate-co-caprolactone) with Controllable Properties for Bone and Nerve Regenerations". Macromolecules, 2005, 38, 7358.

Wilson, G.O.; Henderson, J.W.; Caruso, M.M.; Blaiszik, B.J.; McIntire, P.J.; Sottos, N.R.; White, S.R.; Moore, J.S. "Evaluation of Peroxide Initiators for Radical Polymerization-Based Self-Healing Applications". Journal of Polymer Science. Illinois, 2010, 48, 2698-2708.

Neumann, Miguel G.; Schmitt, Carla C.; Horn Jr., Marco A. "The effect of the mixtures of photoinitiators in polymerization efficiencies". Journal of Applied Polymer Science, 2009, vol. 112(1), 129-134.

Jockusch, S.;Turro, N. J. Phosphinoyl Radicals: Structure and Reactivity. A Laser Flash Photolysis and Time-Resolved ESR Investigation. Journal of American Chemistry Society. 1998, 120,11773-11777.

Lammel-Lindemann, Jan, et al. "Photocrosslinking-based 3D printing of unsaturated polyesters from isosorbide: A new material for resorbable medical devices." Bioprinting 18 (2020): e00062.

\* cited by examiner

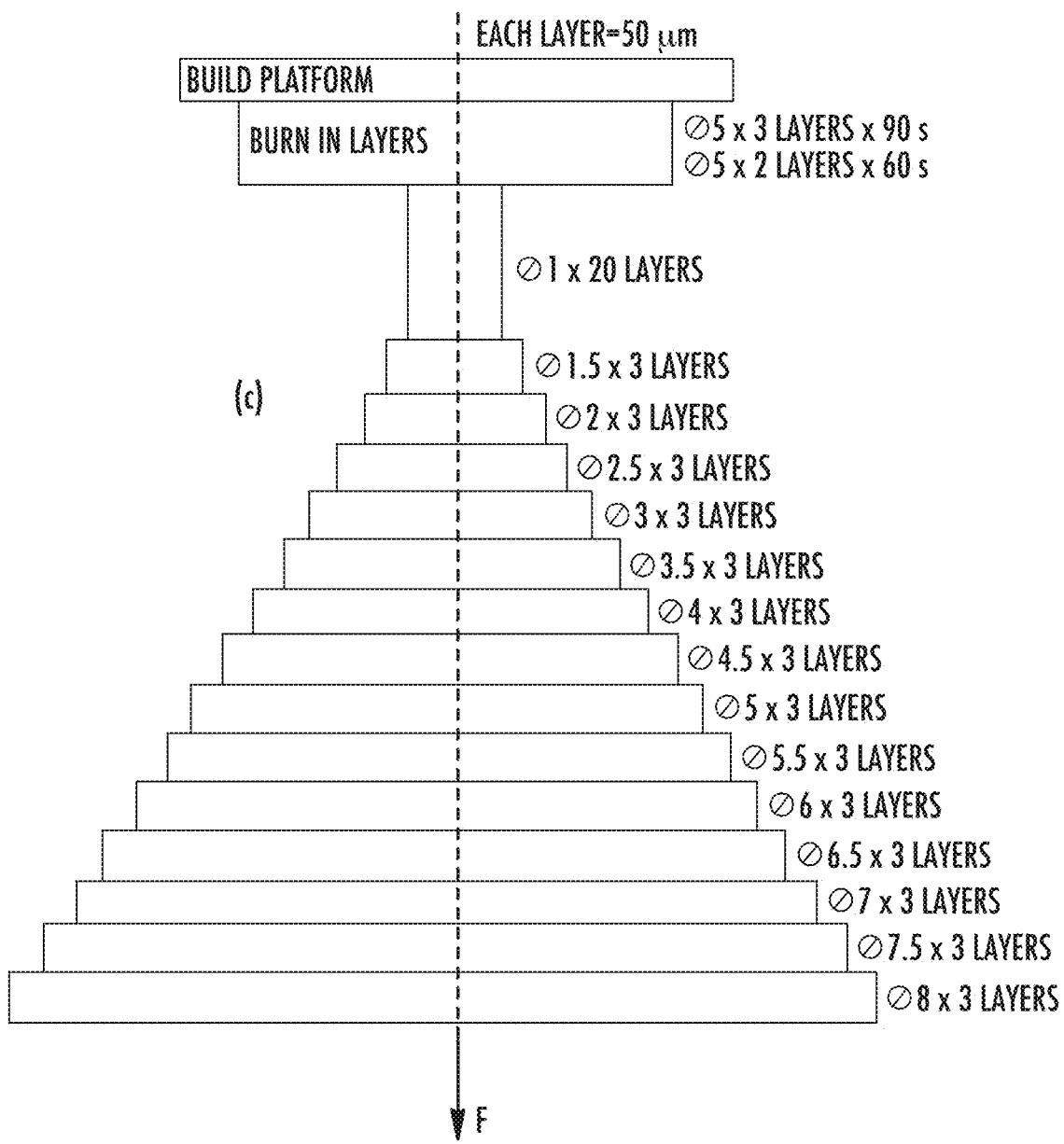
FIGURE 2 (CON'T)

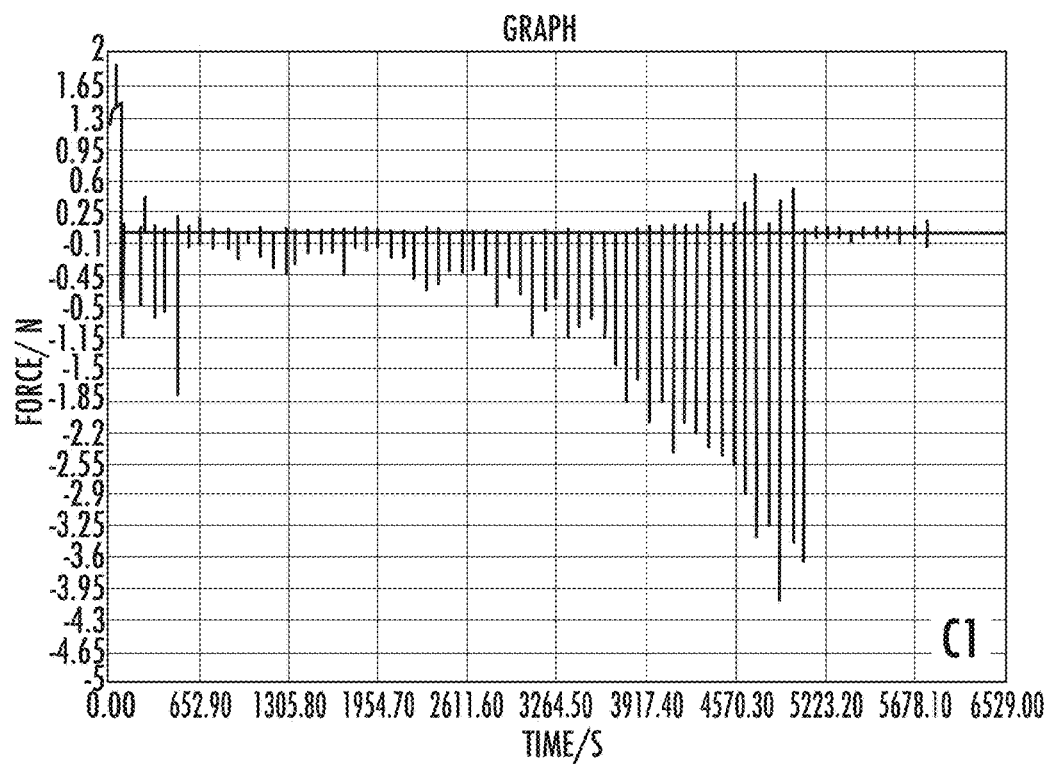
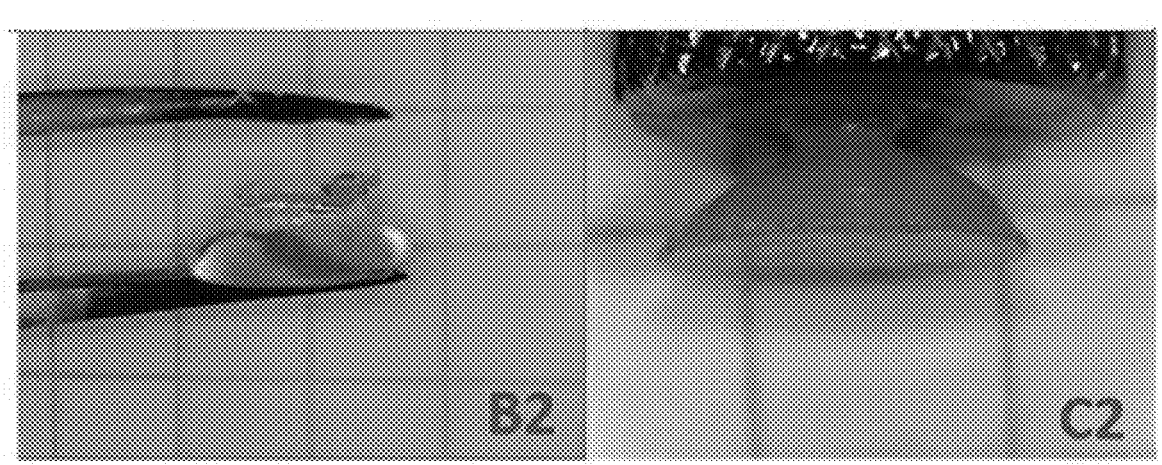
FIGURE 5 (CON'T)

POLYESTERS, POLYMER COMPOSITIONS, AND METHODS OF USING THEREOF

CROSS-REFERENCE TO RELATED APPLICATIONS

This application is a national stage application filed under 35 U.S.C. § 371 of PCT/US2019/058207 filed Oct. 25, 2019, which claims the benefit of priority to U.S. Provisional Application No. 62/750,665, filed Oct. 25, 2018, which is incorporated by reference herein in its entirety.

BACKGROUND

Despite at least 30 years of research, there are very few tissue-engineered devices used clinically. To this date, there is no "synthetic bone substitute", and this is evident by the need for allografting bone from the patient's own body to do major surgical reconstructions. Current implants tend to be strong metals that generate stress shielding and possibly resorption of the adjacent bone and preventing adaptive remodeling. The balance between providing structural support while minimizing stress shielding leaves a very tight window that material science is trying to fill. One of the main reasons for the search for new implant manufacturing strategies is the limited number of biocompatible resorbable materials, especially polymers, which can be used safely to prepare hydrogel and/or solid-cured scaffolds. Very few of these materials can be formed by 3D printing into porous, patient-specific shapes. New materials are needed to address these and other needs.

SUMMARY

Provided herein are polyesters that comprise (i) monomer units derived from sugar-based bicyclic diol; (ii) monomer units derived from an unsaturated aliphatic diacid; and (iii) monomer units derived from a saturated aliphatic diacid. Optionally, the polyester can further comprise monomer units derived from one or more additional diols, monomer units derived from one or more additional diacids, or a combination thereof. In certain embodiments, the polyester can be substantially free of aromatic monomer units.

In some embodiments, the sugar-based bicyclic diol can comprise a dianhydrohexitol, such as isosorbide, isoidide, isomannide, or a combination thereof. In certain embodiments, the dianhydrohexitol can comprise isosorbide. In some embodiments, the sugar-based bicyclic diol can comprise a bicyclic diacetalized hexitol, such as 2,4:3,5-di-O-methylene-D-mannitol (Manx-diol), 2,4:3,5-di-O-methylene-D-glucitol (Glux-diol), or a combination thereof. The monomer units derived from the sugar-based bicyclic diol can be present in an amount of from 10 mole % to 50 mole % of the polyester, such as from 40 mole % to 50 mole % of the polyester, or from 45 mole % to 50 mole % of the polyester.

The unsaturated aliphatic diacid can comprise an α,β-ethylenically unsaturated diacid. For example, the unsaturated aliphatic diacid can comprise fumaric acid, maleic acid, chloromaleic acid, itaconic acid, methylglutaric acid, mesaconic acid, citraconic acid, or a combination thereof. In certain embodiments, the unsaturated aliphatic diacid can comprise fumaric acid. The monomer units derived from the ethylenically unsaturated aliphatic diacid are present in an amount of from greater than 0 mole % to 40 mole % of the polyester (e.g., from greater than 0 mole % to 20 mole % of the polyester).

In some embodiments, the saturated aliphatic diacid can comprise from 4 to 12 carbon atoms. In certain embodiments, the saturated aliphatic diacid can comprise adipic acid, suberic acid, sebacic acid, or a combination thereof.

The polyester can have a number average molecular weight of less than 100,000 Da, such as from 500 Da to 50,000 Da, from 1,000 Da to 50,000 Da, from 1,000 Da to 20,000 Da, from 1,000 Da to 15,000 Da, from 1,000 Da to 10,000 Da, from 1,000 Da to 5,000 Da, or from 1,000 Da to 4,000 Da. In some embodiments, the polyester can have a polydispersity index (PDI) of less than 5 or less than 4, such as a PDI of from 1.5 to 3.5, a PDI of from 1.5 to 3, or a PDI of from 1.5 to 2.5. In some embodiments, the polyester can be produced by enzymatic catalysis.

In one example, the polyester can comprise (i) from 40 mole % to 50 mole % monomer units derived from sugar-based bicyclic diol (e.g., isosorbide); (ii) from greater than 0 mole % to 20 mole % monomer units derived from an unsaturated aliphatic diacid (e.g., fumaric acid); and (iii) from 30 mole % to 50 mole % monomer units derived from a saturated aliphatic diacid (e.g., adipic acid).

Also provided are photocrosslinkable resin compositions that comprise a polyester described herein and a photocrosslinker. The polyester can comprise from 25% by weight to 95% by weight of the resin composition, such as from 30% by weight to 90% by weight of the resin composition, from 40% by weight to 80% by weight of the resin composition, or from 55% by weight to 75% by weight of the resin composition.

The photocrosslinker can comprise a biocompatible photocrosslinker. For example, in some embodiments, the photocrosslinker can comprise a bisacylphosphine oxide, such as Irgacure 819 or Irgacure 784.

In some embodiments, the resin composition can further comprise a solvent, such as ethyl acetate.

In some embodiments, the resin composition further comprises a co-crosslinker, such as a vinylether, a vinylester, a vinylamide, an itaconate, an enamine, or a mixture thereof. In some examples, the co-crosslinker can comprise 1-vinylimidazole, N-isopropylacrylamide, maleic anhydride, N-vinylpyrrolidone, or a combination thereof. In some embodiments, the co-crosslinker can comprise a sugar-based co-crosslinker, such as a sugar-based co-crosslinker defined by Formula I or Formula II below

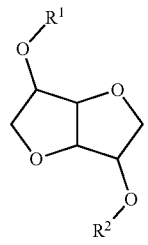

Formula I

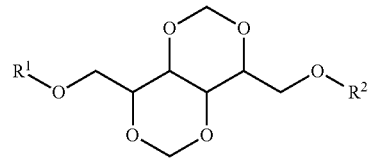

Formula II wherein $R^1$ and $R^2$ are each independently selected from H, C1-C6 alkyl, and an ethylenically unsaturated moiety, with the proviso that at least one of $R^1$ and $R^2$ is an ethylenically unsaturated moiety.

In some embodiments, the co-crosslinker can be defined by Formula IA, Formula IB, or Formula IC

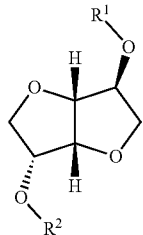

Formula IA

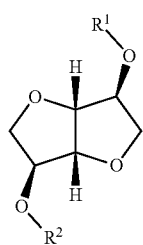

Formula IB

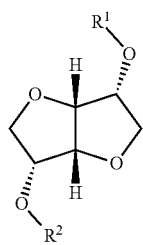

Formula IC wherein $R^1$ and $R^2$ are each independently selected from H, C1-C6 alkyl, and an ethylenically unsaturated moiety, with the proviso that at least one of $R^1$ and $R^2$ is an ethylenically unsaturated moiety. In some of these embodiments, $R^1$ and $R^2$ are each independently selected from H, C1-C6 alkyl, and an ethylenically unsaturated moiety selected from vinyl, allyl, acryloyl, and methacryloyl, with the proviso that at least one of $R^1$ and $R^2$ is an ethylenically unsaturated moiety.

In some embodiments, the resin composition can further comprise a surface functionalization agent, such as a serum protein or crystals such as beta tricalcium phosphate and/or hydroxyapatite to enhance cell attachment.

In some embodiments, the resin composition further comprises a dye, such as oxybenzone (2-hydroxy-4-methoxybenzophenone, also referred to as HMB), $TiO_2$, or a combination thereof.

The polyesters described herein can be crosslinked (e.g., in an additive manufacturing process) to form articles of manufacture. Accordingly, provided herein are methods of producing a three-dimensional object using additive manufacturing. These methods can comprise forming the three-dimensional object on a layer-by-layer basis by crosslinking a polyester described herein. Depending on the additive manufacturing process employed, the polyester can be thermally crosslinked or photocrosslinked.

Also provided are method of forming an object via additive manufacturing that comprise irradiating a first quantity of a resin composition described herein on a substrate to induce photocrosslinking of the polyester into a first layer on the substrate; and forming at least one additional layer on the first layer by irradiating at least a second quantity of the resin composition described herein to induce photocrosslinking of the polyester into the at least one additional layer on the first layer, thereby forming the object.

Also provided are methods of manufacturing a three-dimensional object that comprise receiving data representing at least the three-dimensional object at a Digital Light Processing (DLP) additive manufacturing apparatus including a Digital Micromirror Device (DMD); actuating the DMD to project light corresponding to layers of the three-dimensional object onto a transparent or translucent plate above which is disposed a build plate and a resin composition described herein including a polyester; and shifting the build plate at selected increments such that the projected light sequentially causes the polyester within regions of the resin composition to at least partially photocrosslink to substantially resemble the layers of the three-dimensional object.

Also provided is a process for continuous digital light processing (cDLP) manufacturing of a three-dimensional object that comprises providing an additive manufacturing apparatus including a Digital Micromirror Device (DMD) and a transparent or translucent plate; providing a resin composition described herein including a polyester; depositing an amount of the resin composition above the transparent or translucent plate; actuating the DMD to expose at least some amount of the resin composition to light to at least partially crosslink the polyester therein to form a layer of the three-dimensional object; actuating the DMD to expose at least some additional amount of the resin composition to light to at least partially crosslink the polyester therein to form an additional layer of the three-dimensional object and to at least partially overcure at least some of a previous layer to cause at least some interlayer binding between the previous layer and the additional layer; and repeating the actuating the DMD step to expose at least some additional amount of the resin composition a number of times as necessary to physically render the three-dimensional object layer by layer.

Also provided are articles of manufacture formed using the methods described herein. In some embodiments, the article can be resorbable upon implantation in a human subject. In certain embodiments, the article can comprise a tissue engineering scaffold or medical implant.

BRIEF DESCRIPTION OF THE FIGURES

The accompanying figures, which are incorporated in and constitute a part of this specification, illustrate several aspects described below.

without the addition of a photoattenuator (HMB). An image showcasing a cured film after measurement is included for illustration purposes.

Figure 4:
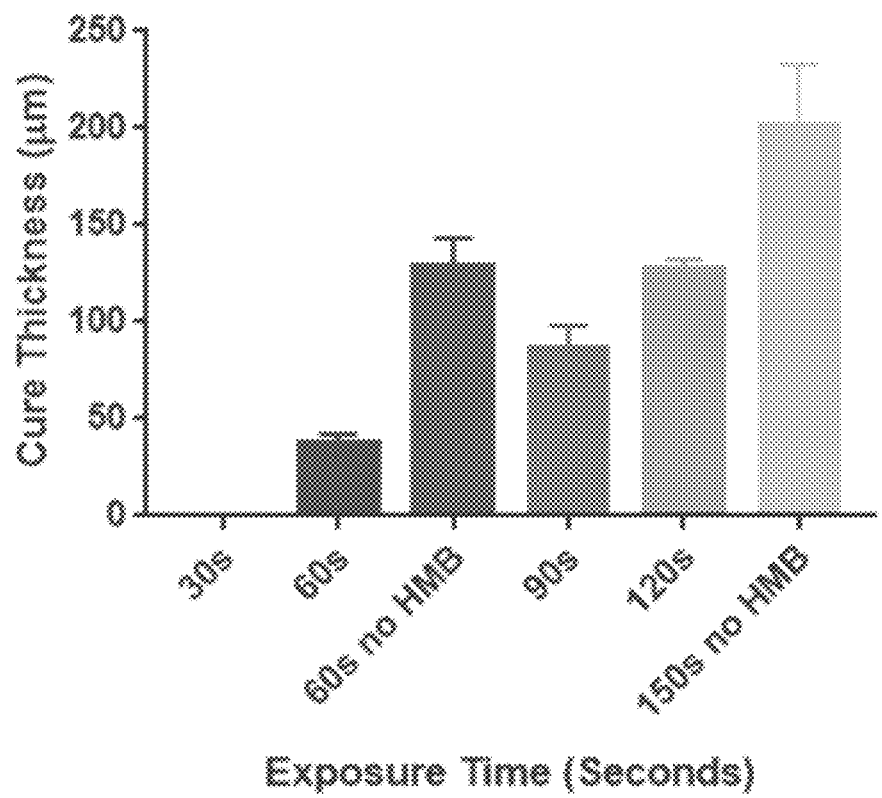

FIG. 4 is a plot showing the effect of HMB on the cure thickness of resin formulation type A (5% double bonds).

Figure 5:
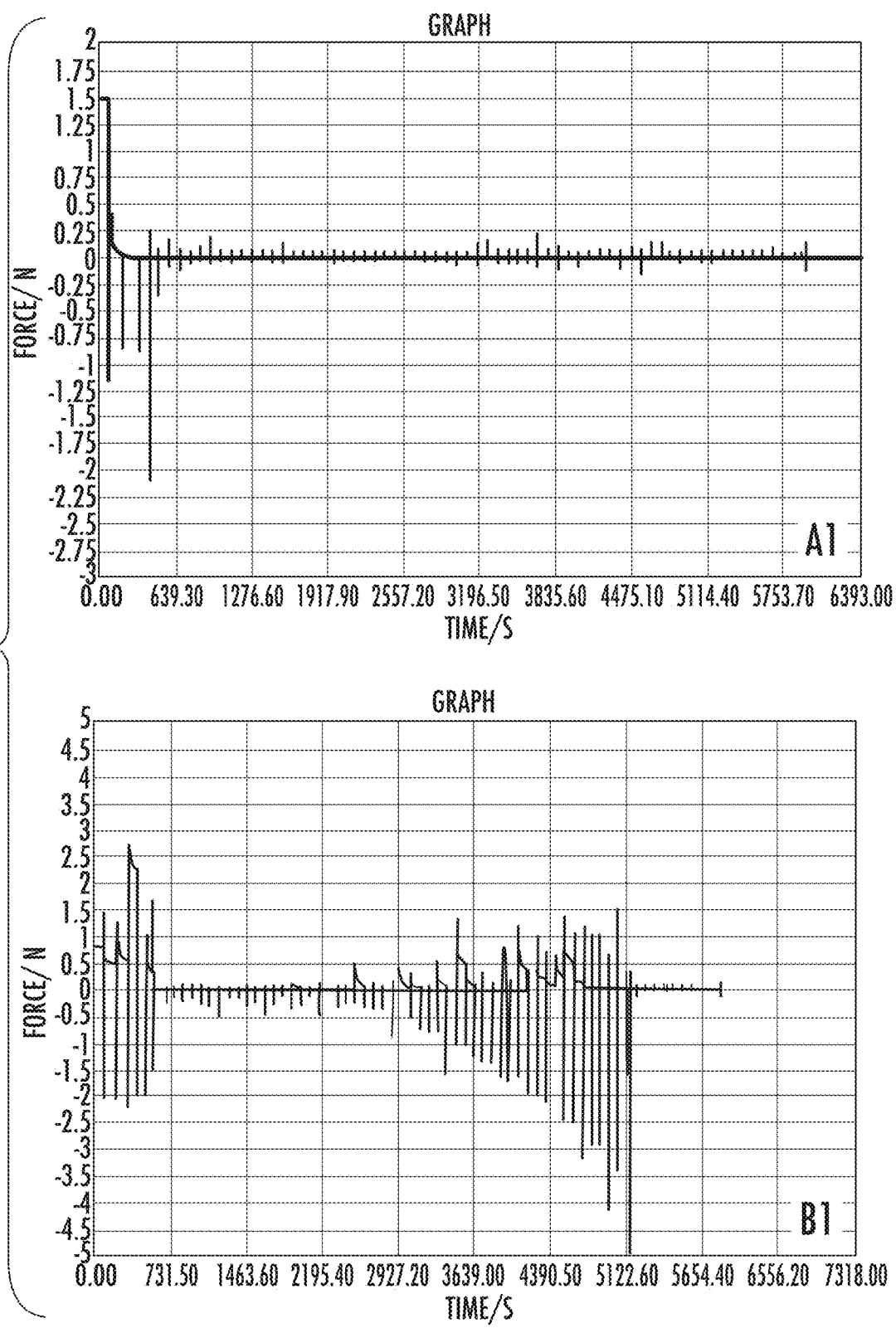

FIG. 5 shows force plots taken during the cDLP printing of the resins as well as parts recovered following printing. A1 corresponds to the resin A. The part failed to print after the burn-in plate. B2 corresponds to resin B, and the part recovered is shown in B2. C1 corresponds to resin C, and the part recovered is shown in C2.

Figure 6:
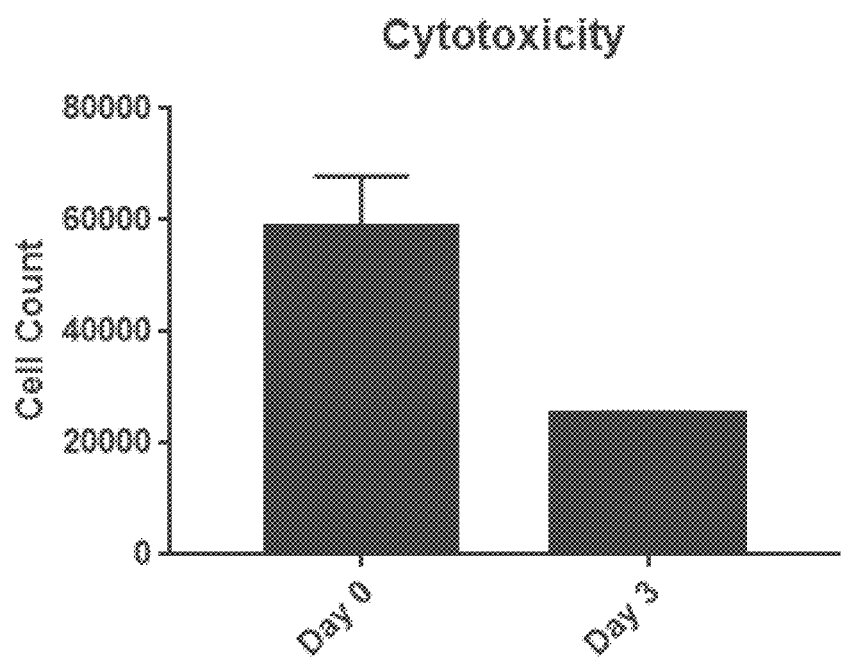

FIG. 6 is a plot showing the cytotoxicity of the printed thin films tested by presto blue. Cells were shown to survive after being seeded on the thin films after 3 days.

Figure 7:
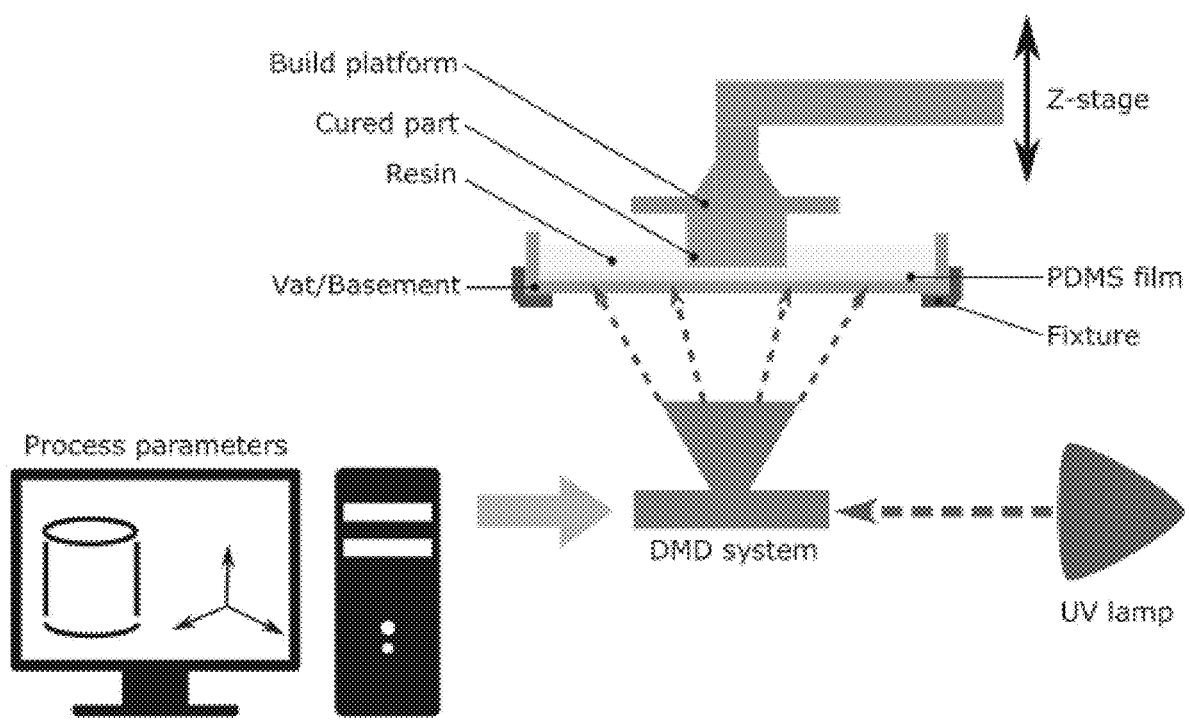

FIG. 7 is a schematic illustration of the cDLP printing process and photocuring.

Figure 8:
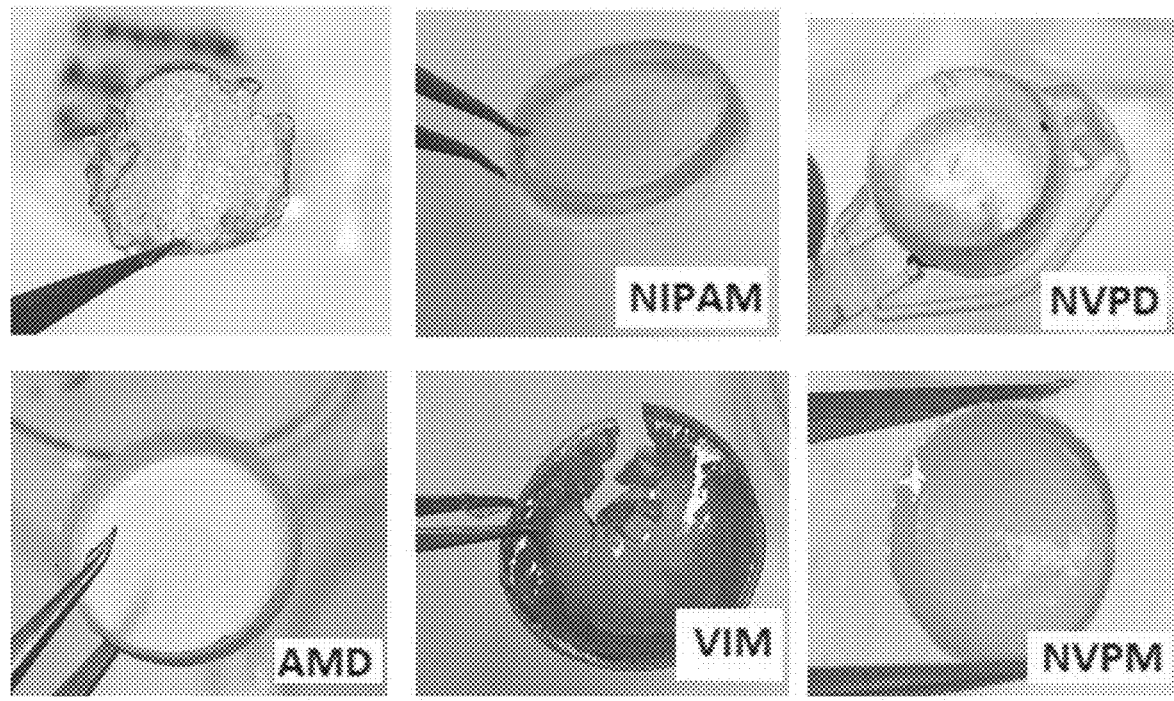

FIG. 8 shows images of crosslinked films prepared from resins containing varying crosslinkers after 1 minute of exposure to light.

Figure 9A:
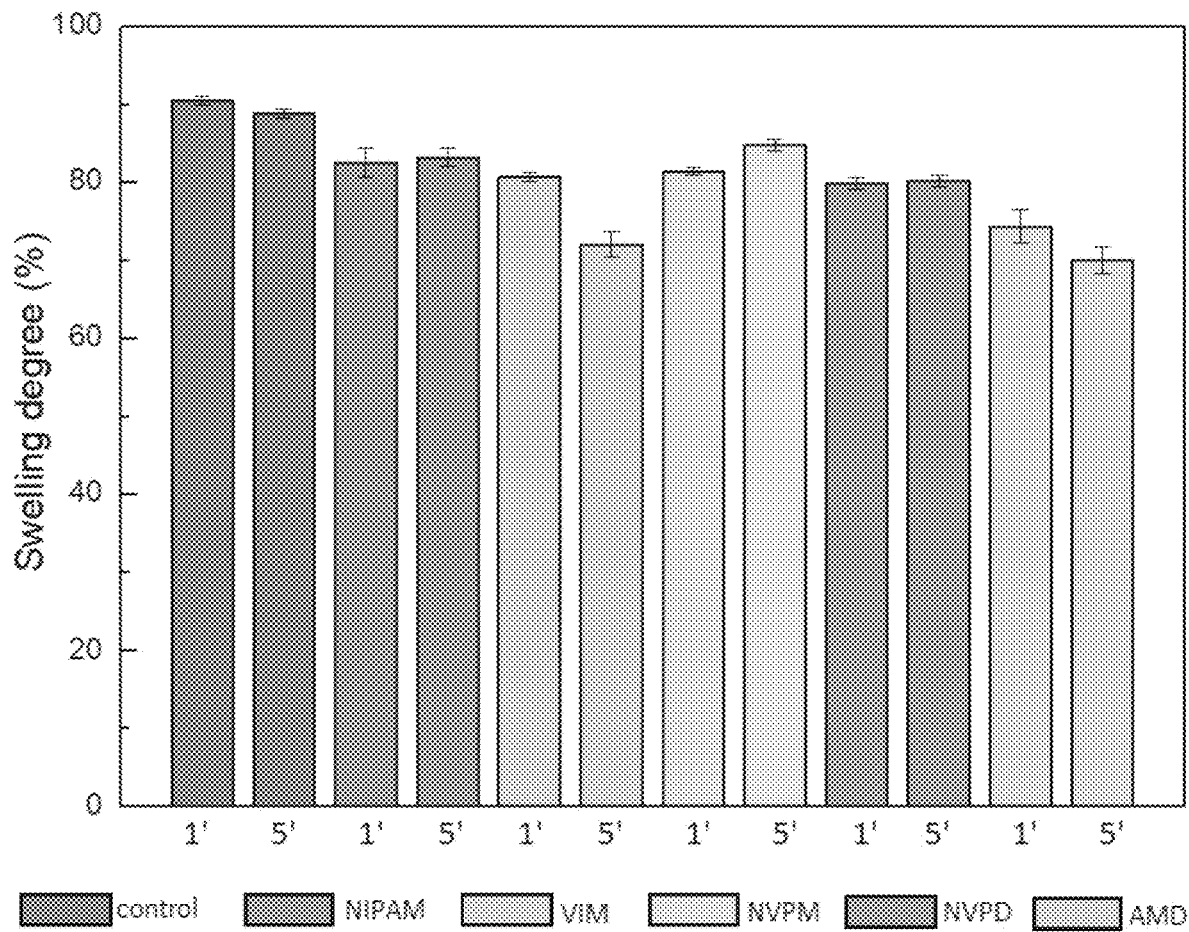

FIG. 9A is a plot showing the swelling degree % for P(ISAD-co-ISFU) with 12% of double bond and different crosslinkers. 1 and 5 represent, respectively, 1 and 5 minutes of exposure to light.

Figure 9B:
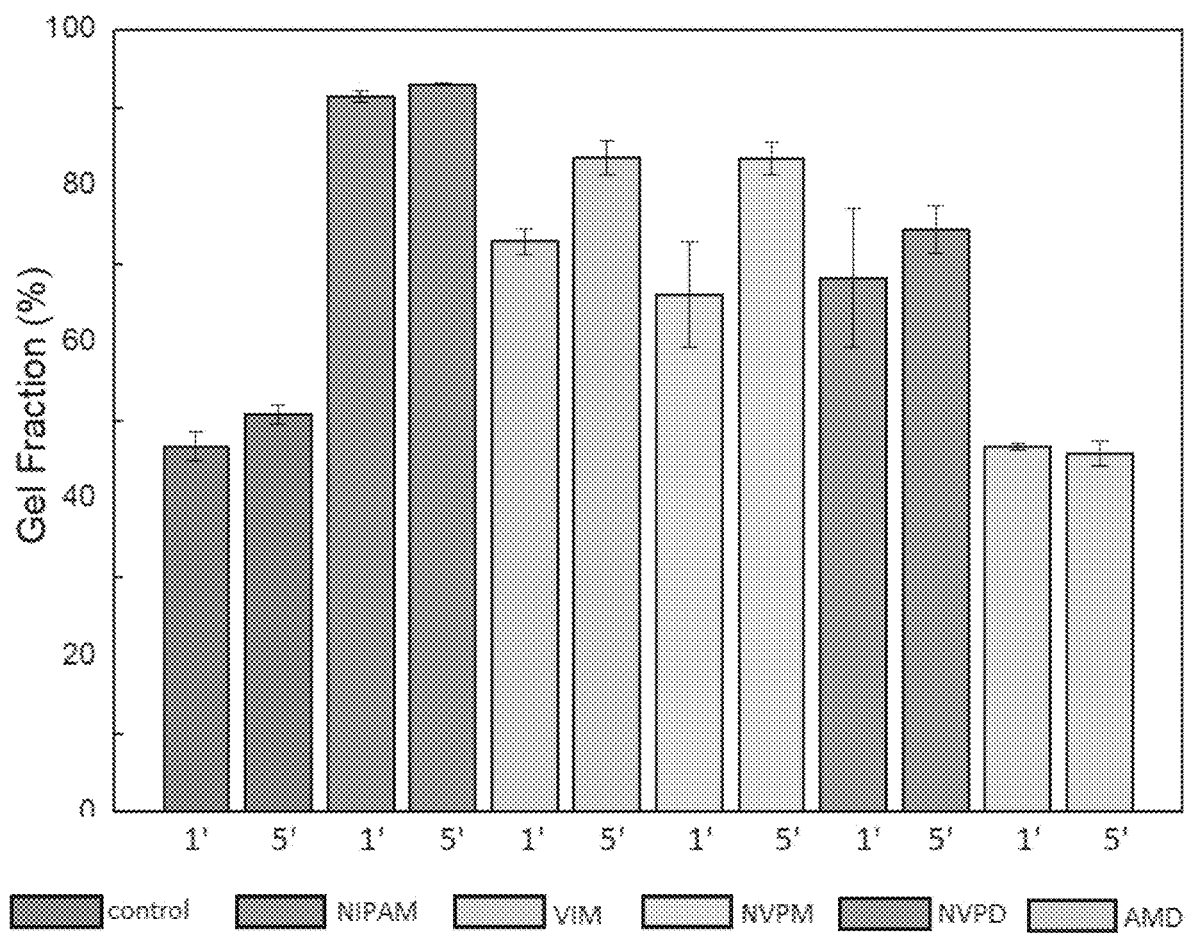

FIG. 9B is a plot showing the gel fraction % for P(ISAD-co-ISFU) with 12% of double bond and different crosslinkers. 1 and 5 represent, respectively, 1 and 5 minutes of exposure to light.

Figure 10:

FIG. 10 shows printed resin made with 12% of unsaturation, VIM, and BAPO.

Figure 11:
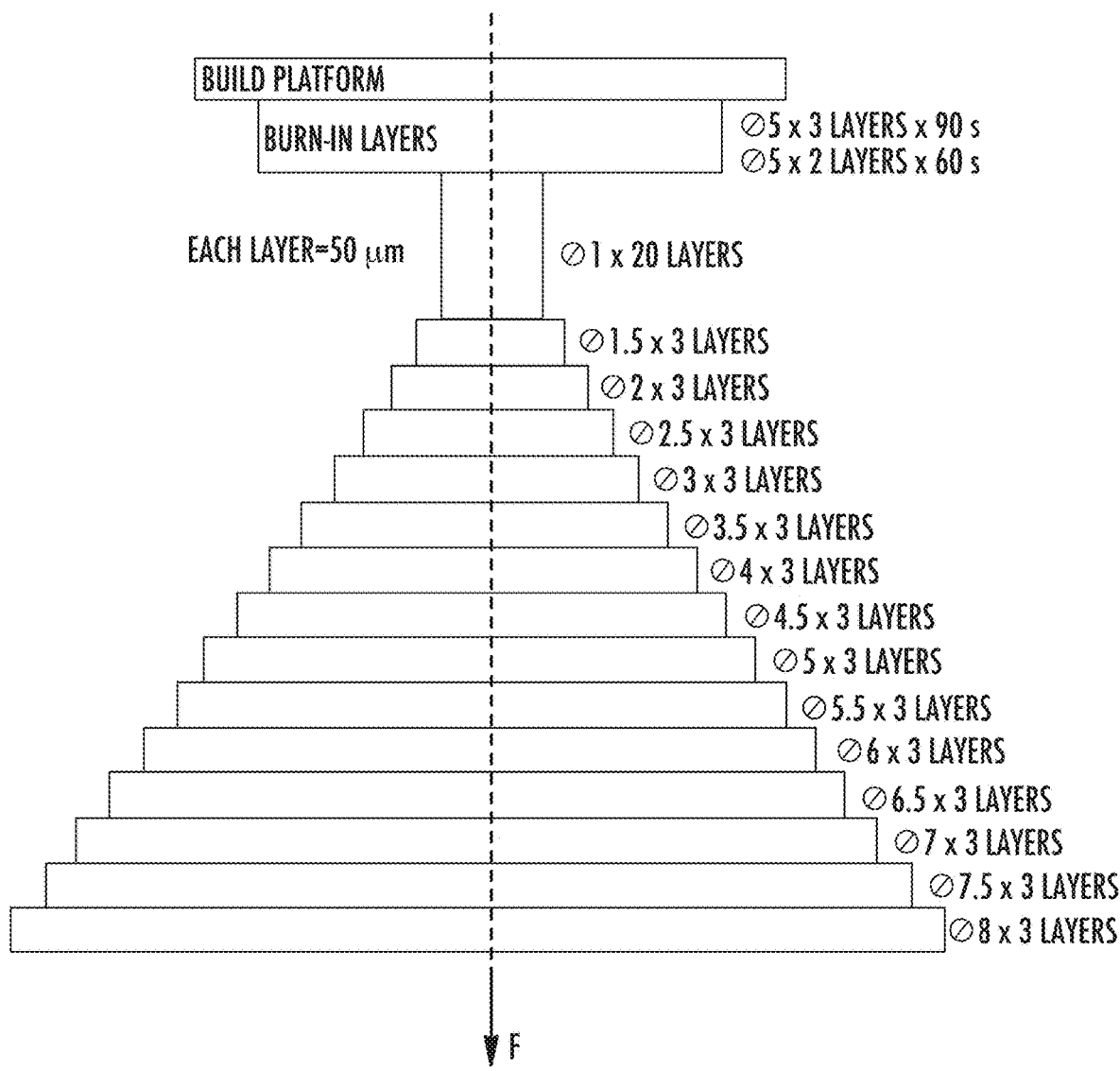

FIG. 11 is a schematic illustration of a method used to measure breaking load/interlayer green strength during the printing process.

Figure 12:
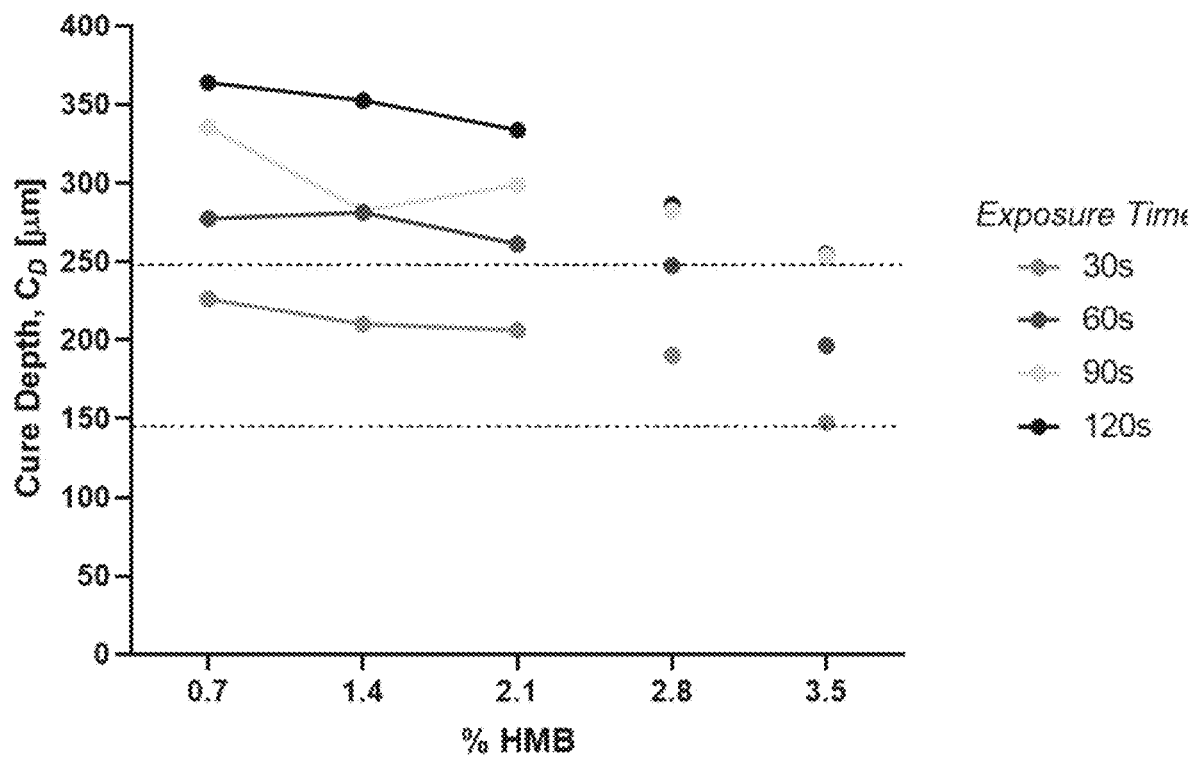

FIG. 12 is a plot showing the cure depth of Iso1 and Iso2 at different exposure times.

Figure 13:
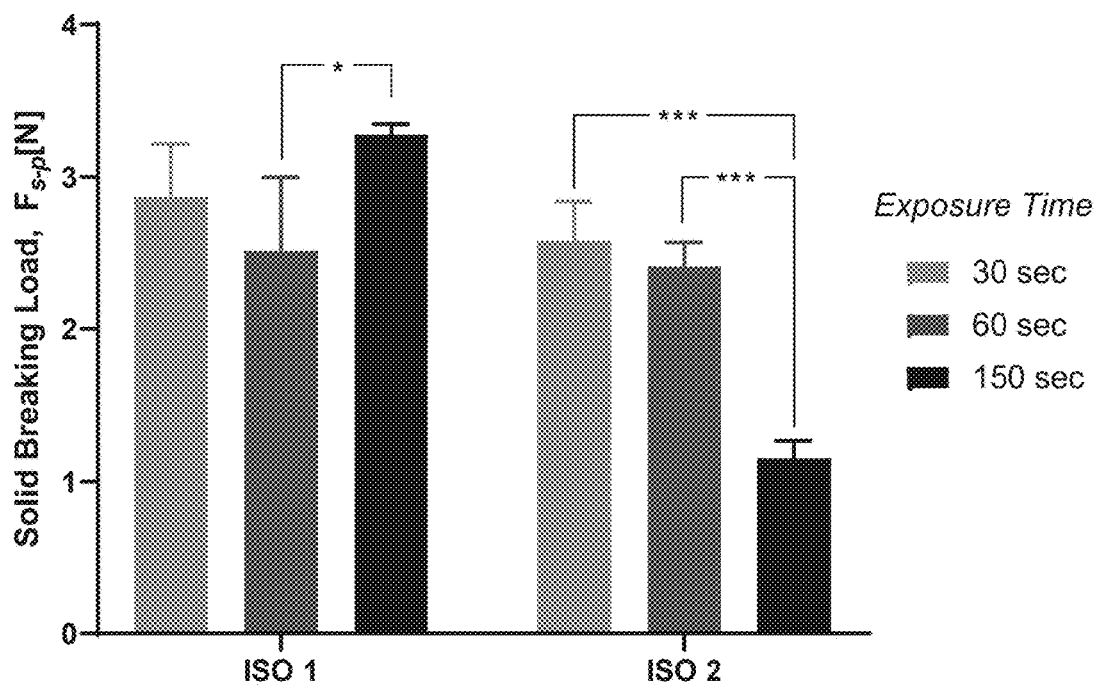

FIG. 13 is a plot showing the maximum loads of a solid cured part formed from isosorbide resins cured at different exposure times.

Figure 14A:
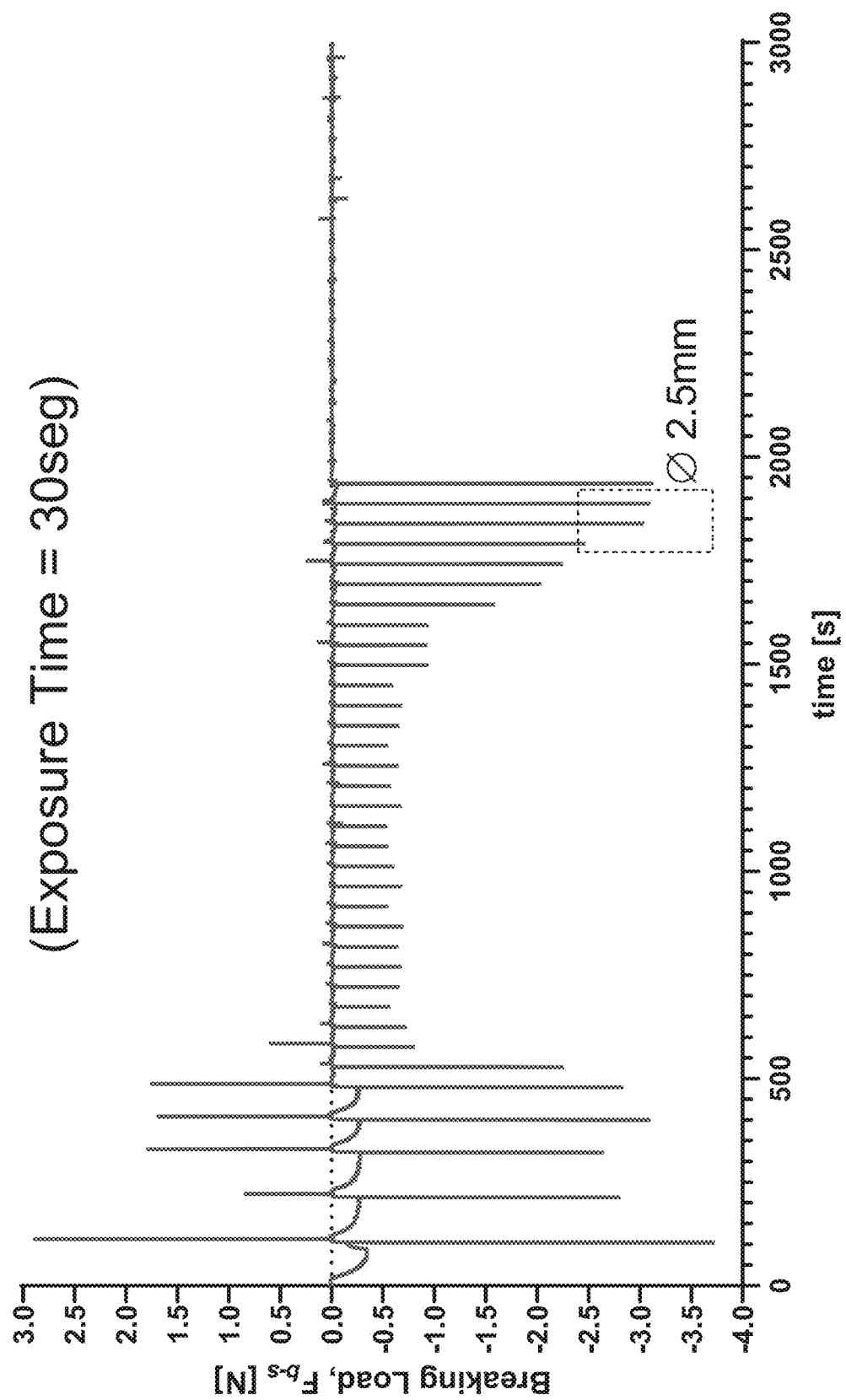
Figure 14B:
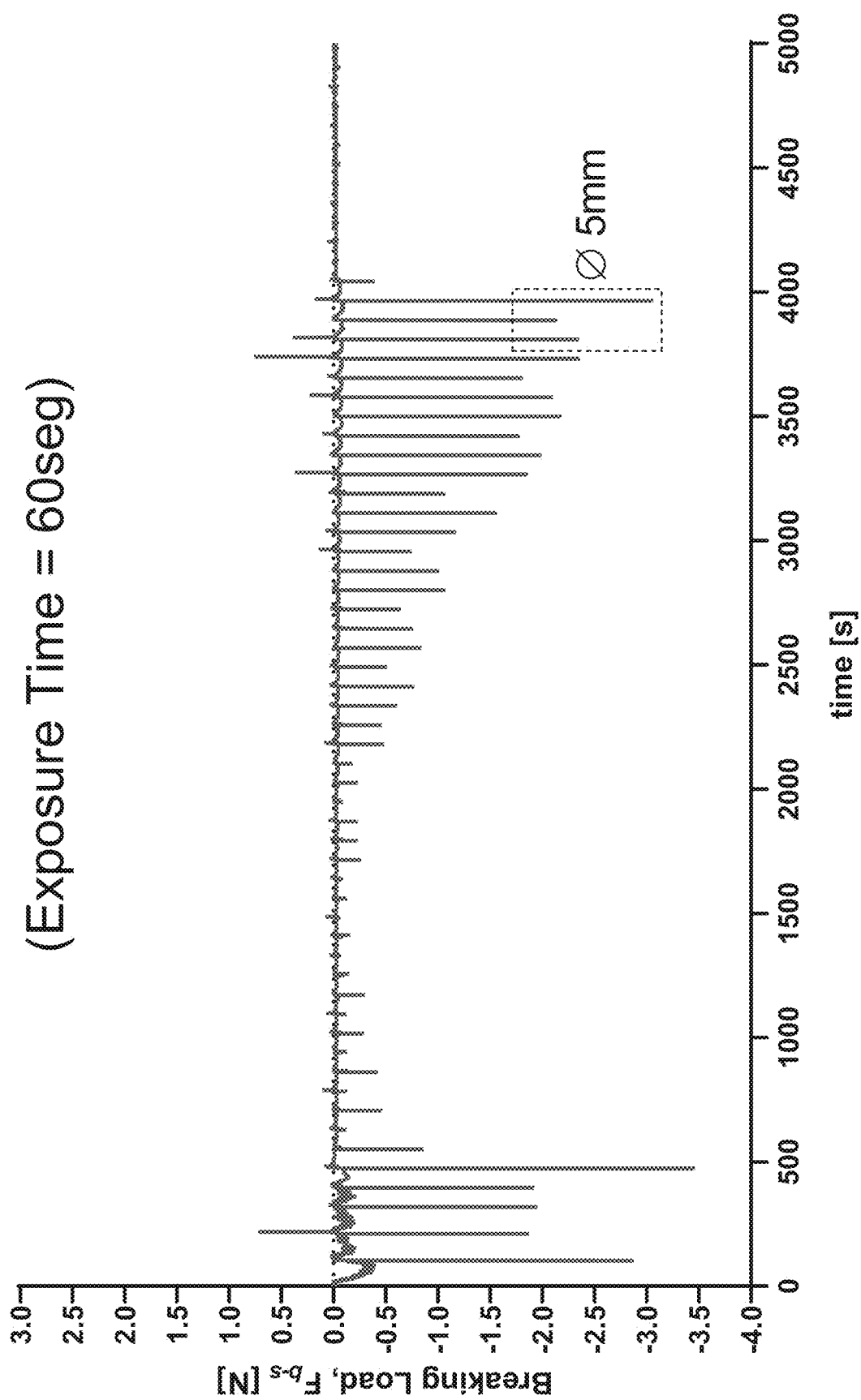
Figure 14C:
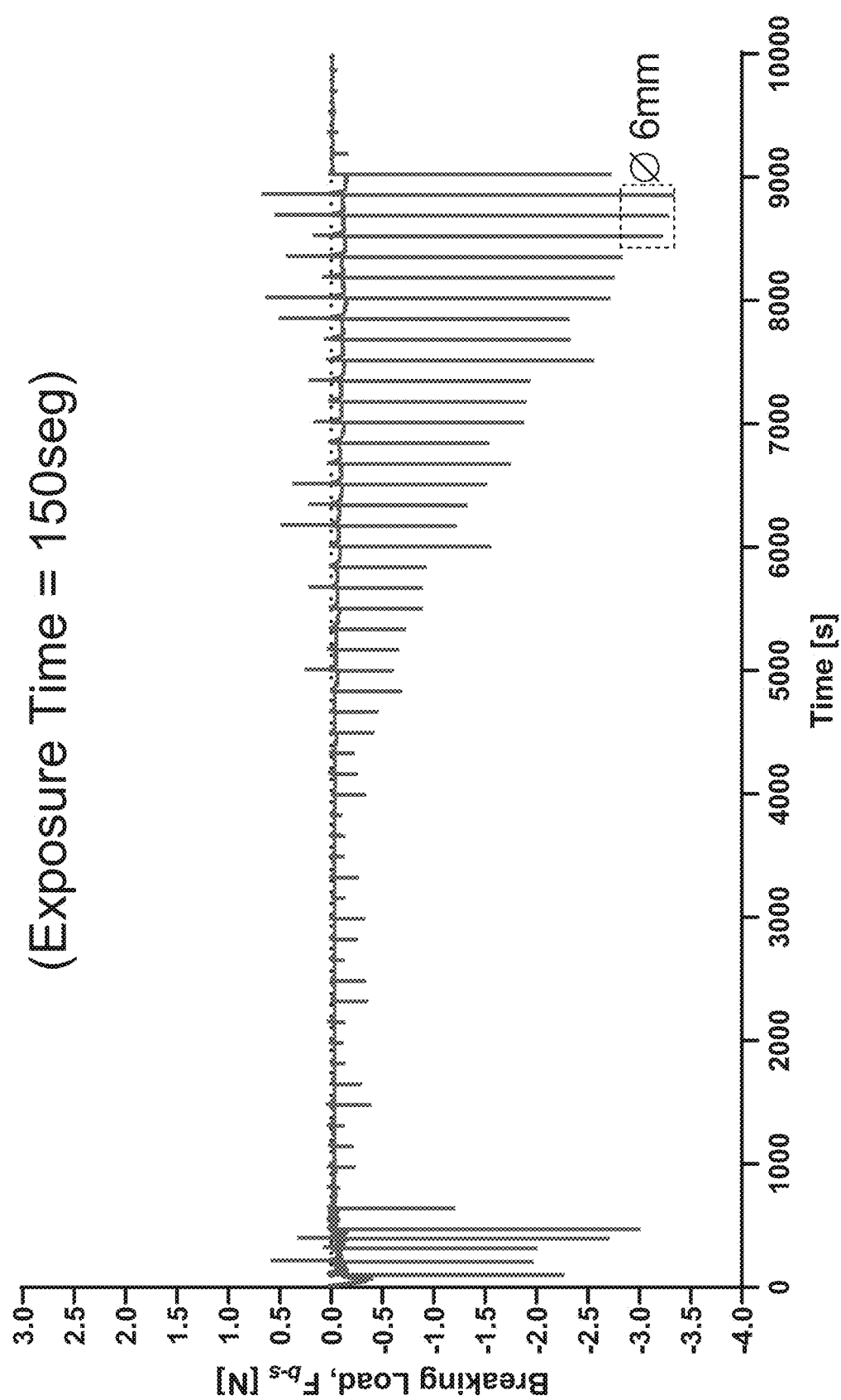
Figure 14D:
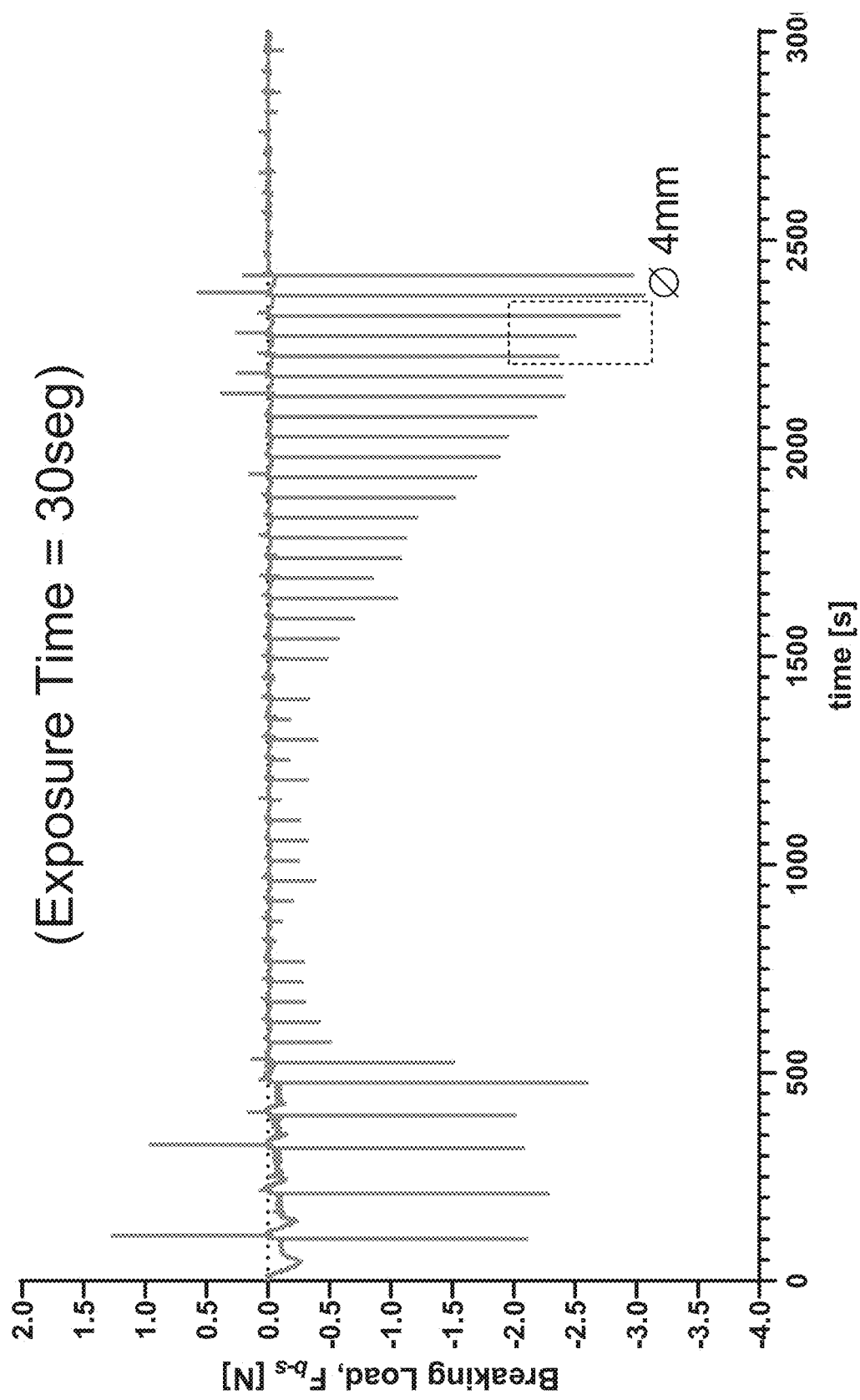
Figure 14E:
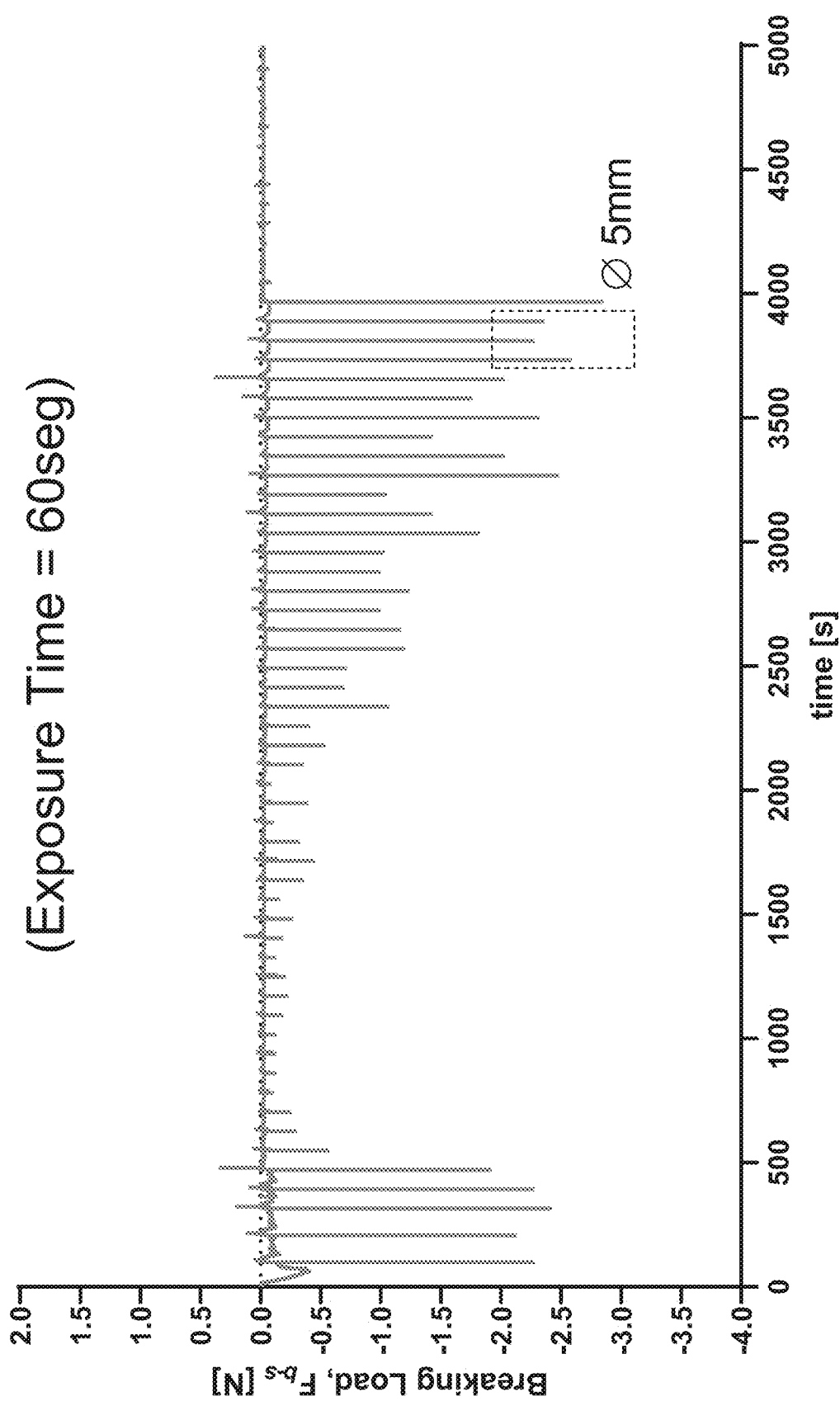
Figure 14F:
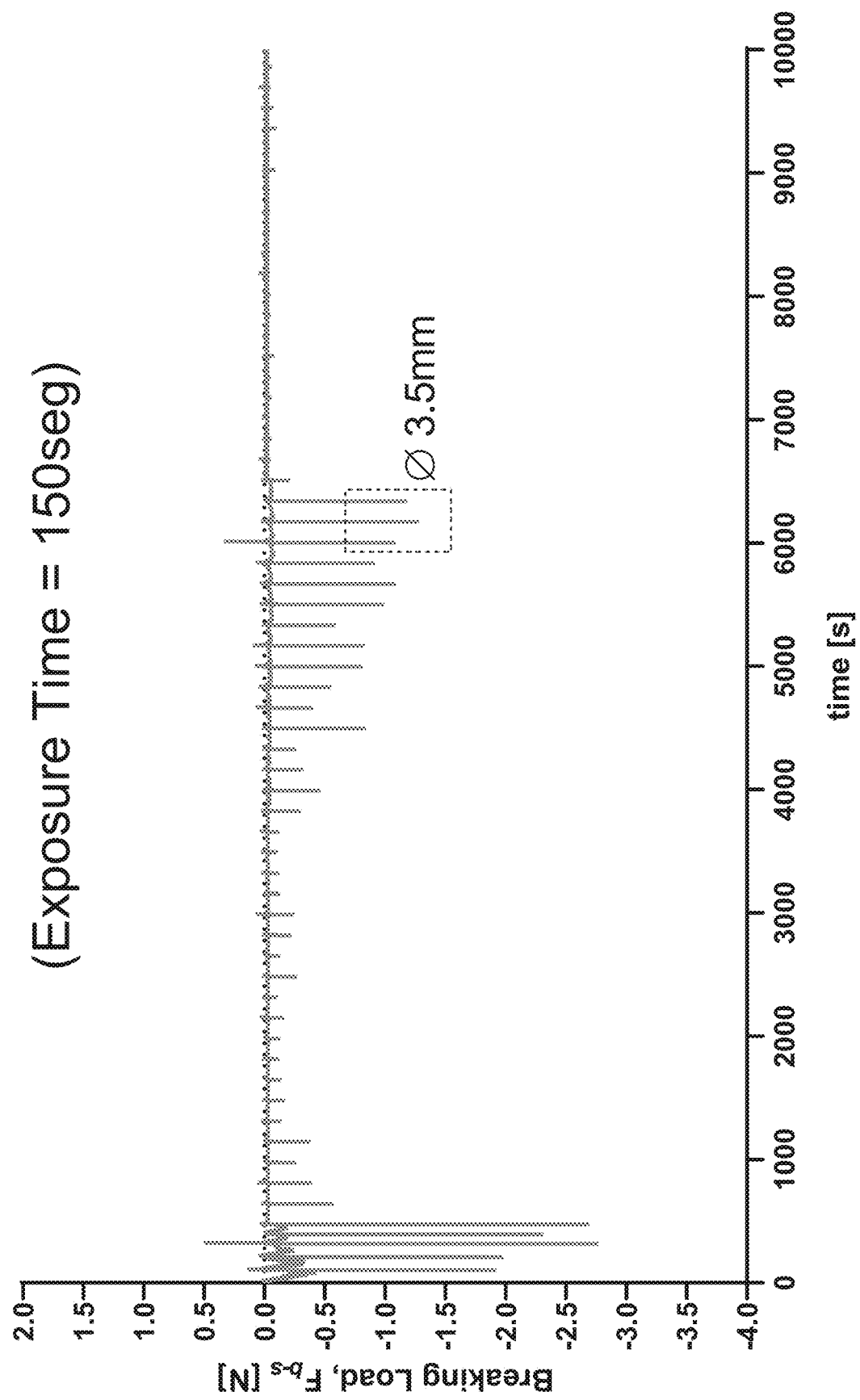

FIGS. 14A-14F show measurements of interlayer binding strength during the printing process. FIGS. 14A-14C show Iso 1 with 2.1% HMB and 4% BAPO with a 30 second (FIG. 14A), 60 second (FIG. 14B), or 150 second (FIG. 14C) exposure time. FIGS. 14D-14F show Iso 2 with 3.5% HMB and 5% BAPO with a 30 second (FIG. 14D), 60 second (FIG. 14E), or 150 second (FIG. 14F) exposure time.

Figure 15A:
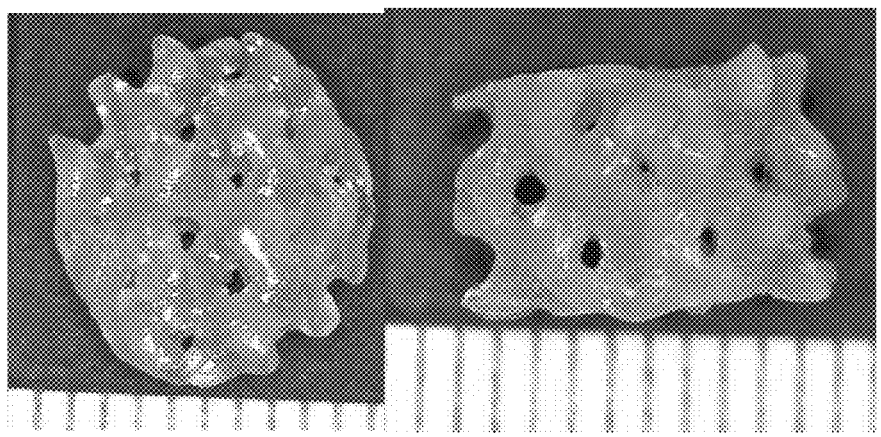
Figure 15B:
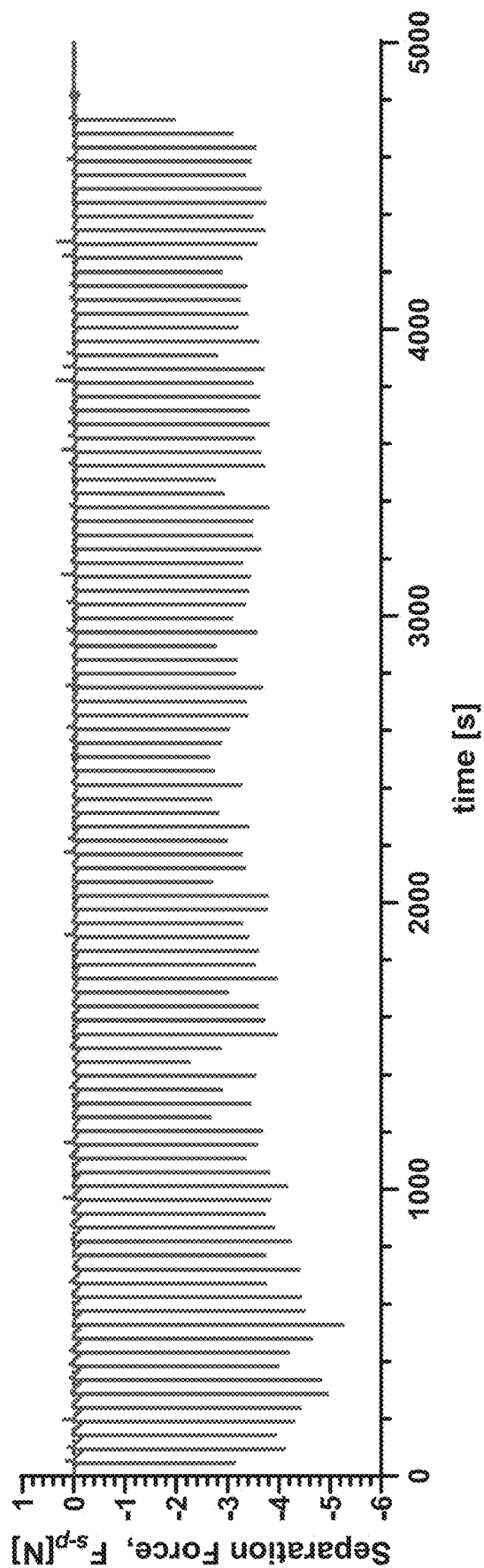
Figure 15C:
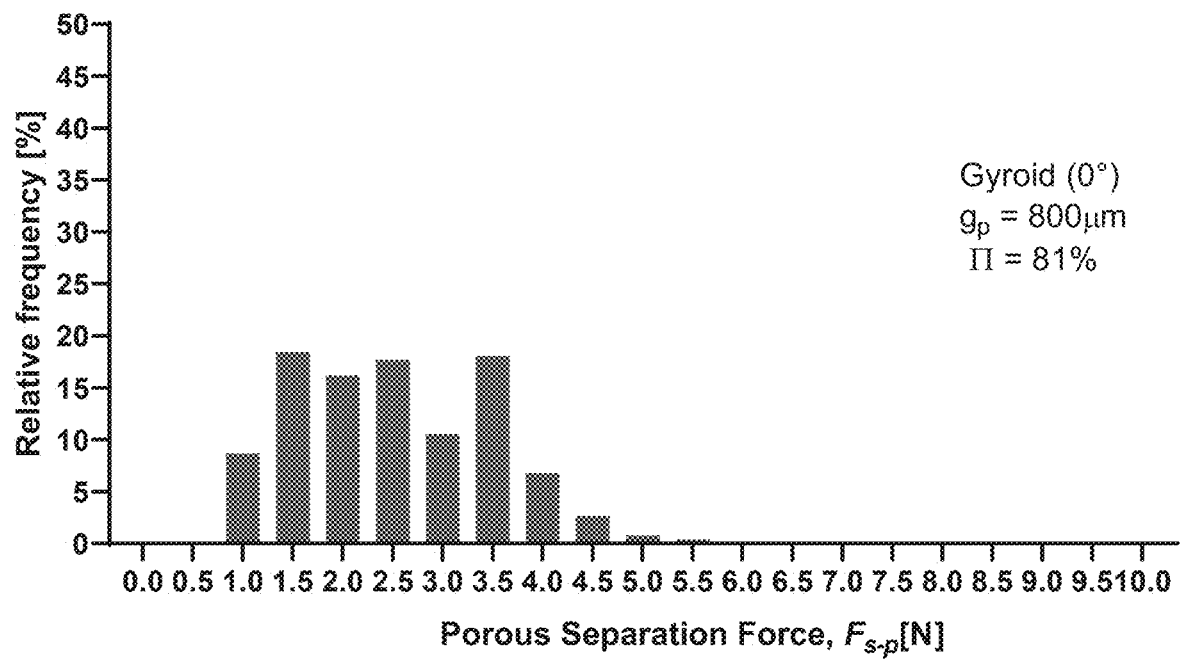

FIGS. 15A-15C show a 0°-gyroid porous scaffold printed with resin Iso 1 using 30 s of exposure time. The scaffold had a porosity of 81%, a pore size of 800 μm, and an average strut size of 1000 μm. FIG. 15A shows images of the printed scaffold. FIG. 15B shows force measured during the printing process. FIG. 15C shows the distribution of separation force of the 0°-gyroid porous scaffold.

Figure 16A:
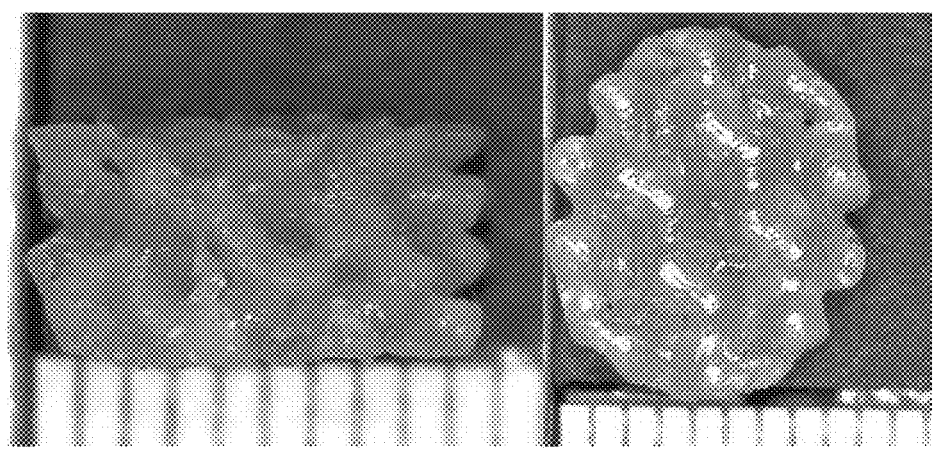
Figure 16B:
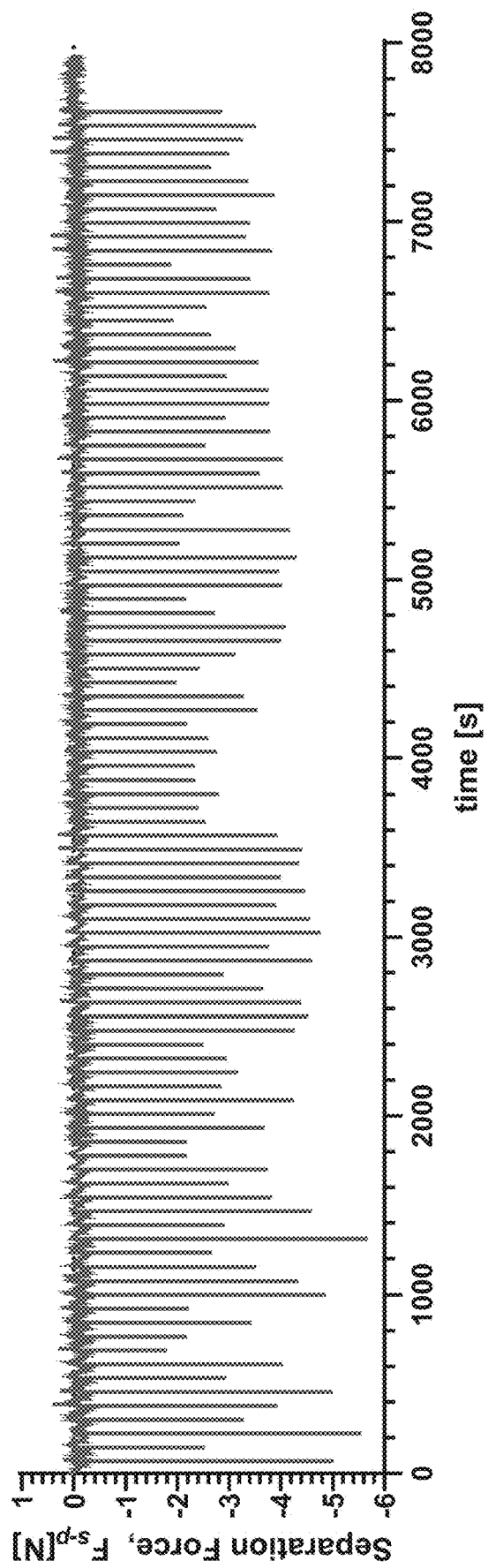
Figure 16C:
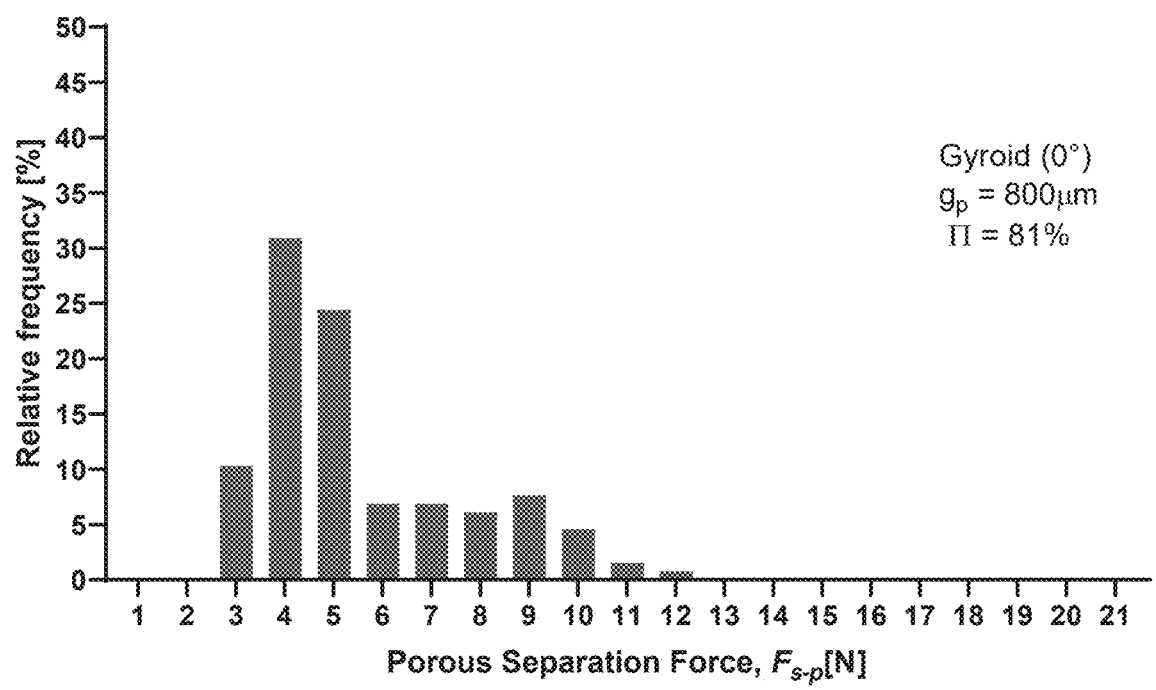

FIGS. 16A-16C show a 0°-gyroid porous scaffold printed with resin Iso 1 using 60 s of exposure time. The scaffold had a porosity of 81%, a pore size of 800 μm, and an average strut size of 1000 μm. FIG. 16A shows images of the printed scaffold. FIG. 16B shows force measured during the printing process. FIG. 16C shows the distribution of separation force of the 0°-gyroid porous scaffold.

Figure 17A:
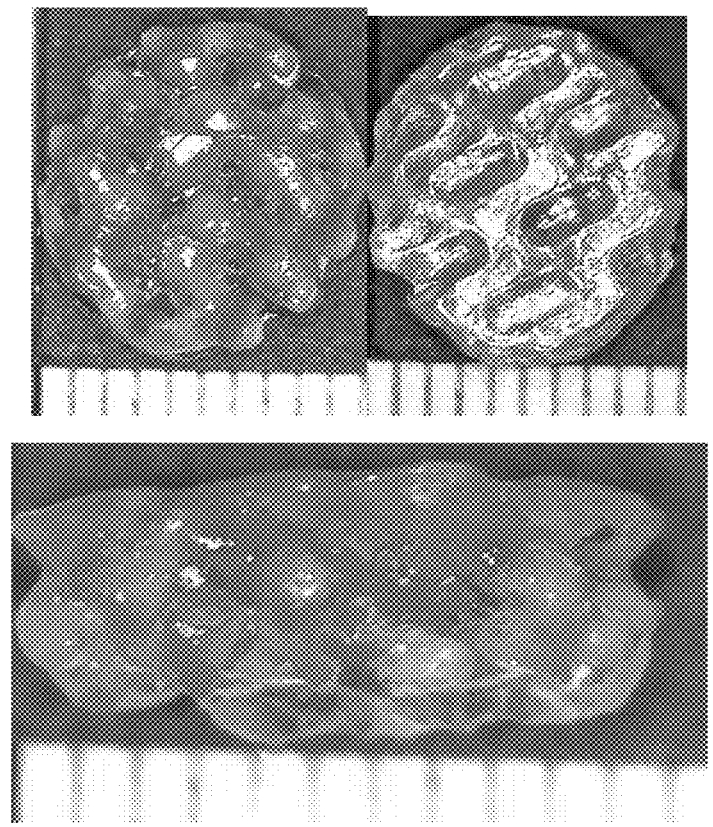
Figure 17B:
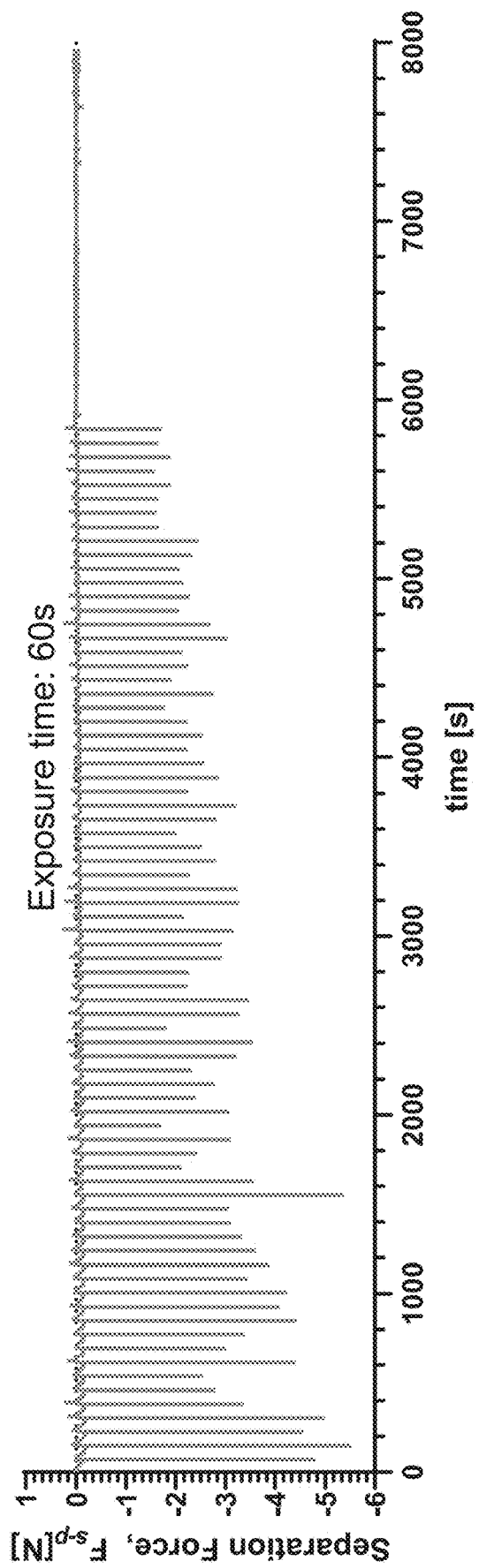
Figure 17C:
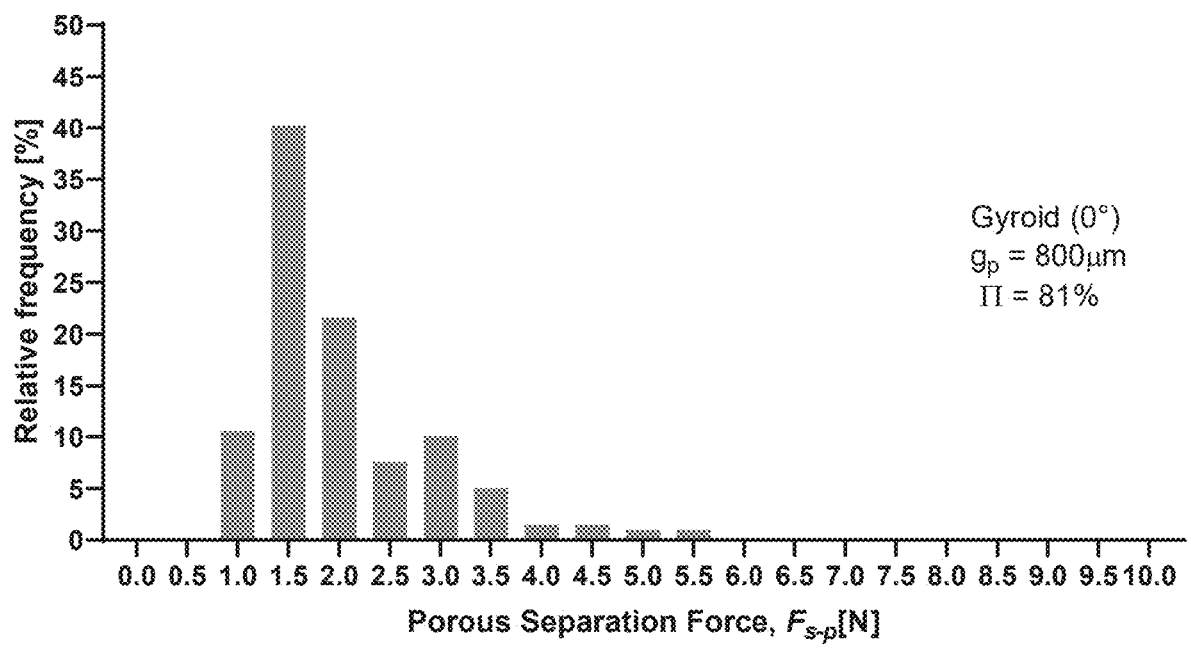

FIGS. 17A-17C show a 0°-gyroid porous scaffold printed with resin Iso 2 using 30 s of exposure time. The scaffold had a porosity of 81%, a pore size of 800 μm, and an average strut size of 1000 μm. FIG. 17A shows images of the printed scaffold. FIG. 17B shows force measured during the printing process. FIG. 17C shows the distribution of separation force of the 0°-gyroid porous scaffold.

Figure 18A:
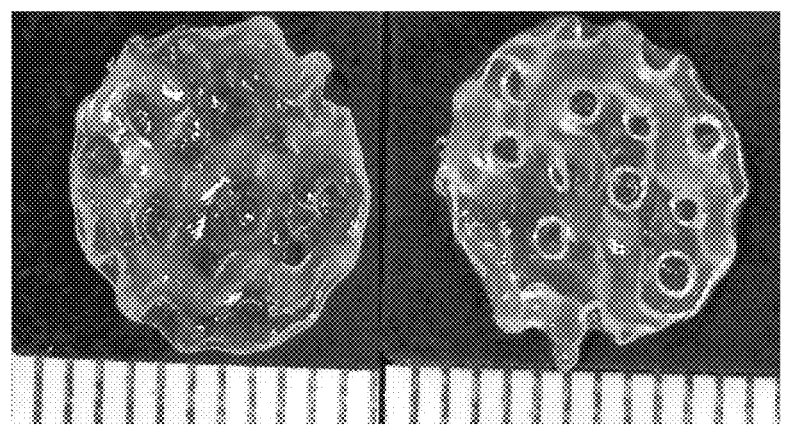
Figure 18B:
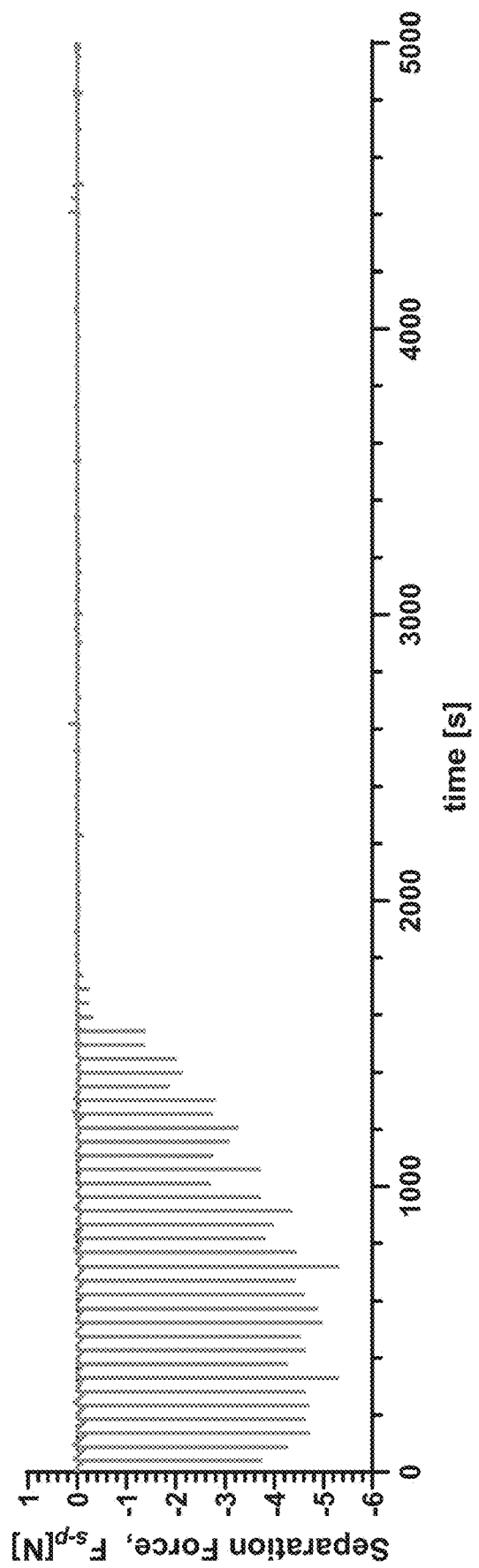
Figure 18C:
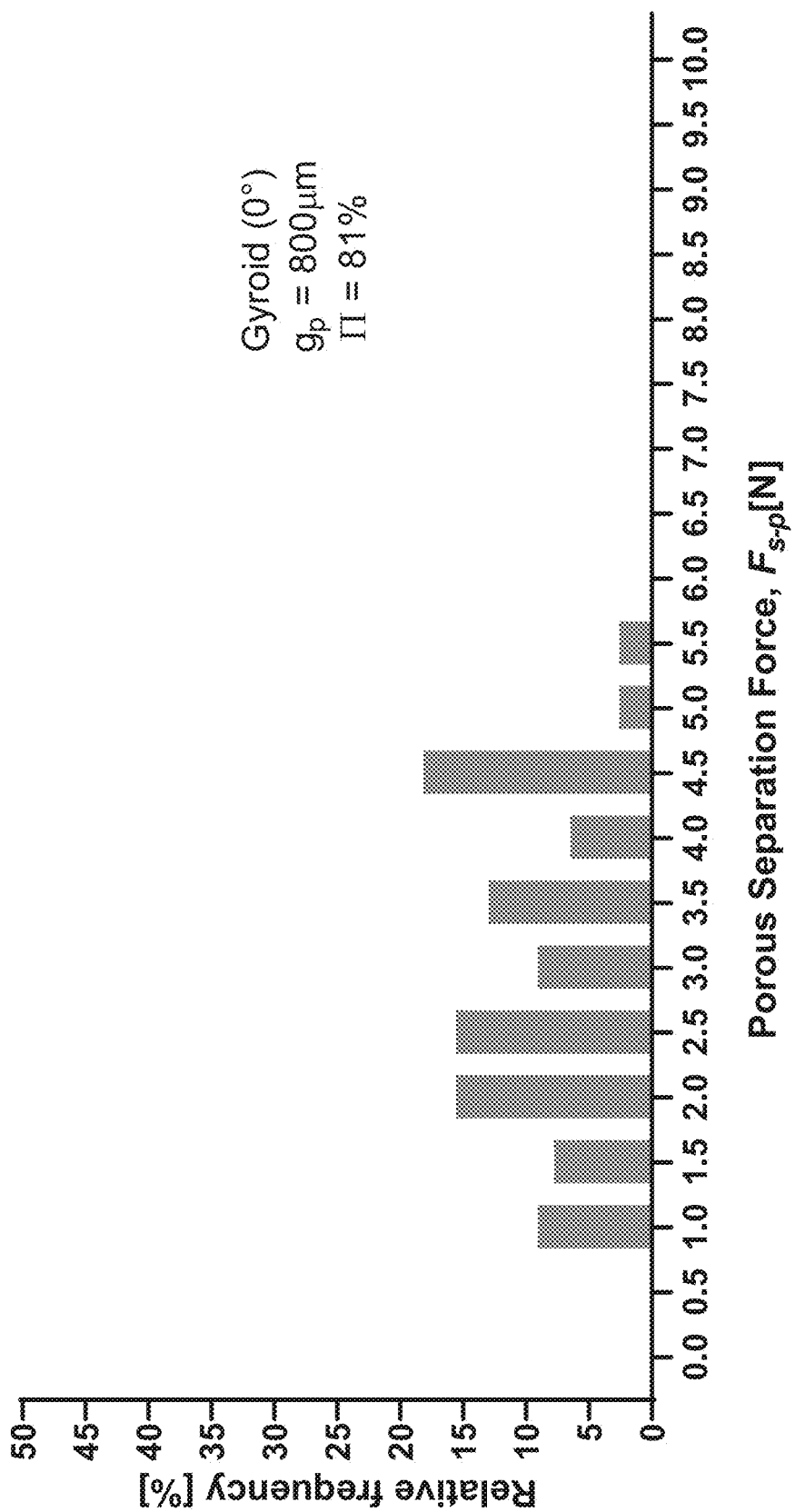

FIGS. 18A-18C show a 0°-gyroid porous scaffold printed with resin Iso 2 using 60 s of exposure time. The scaffold had a porosity of 81%, a pore size of 800 μm, and an average strut size of 1000 μm. FIG. 18A shows images of the printed scaffold. FIG. 18B shows force measured during the printing process. FIG. 18C shows the distribution of separation force of the 0°-gyroid porous scaffold.

DETAILED DESCRIPTION

The materials, compounds, compositions, articles, and methods described herein may be understood more readily by reference to the following detailed description of specific aspects of the disclosed subject matter and the Examples included therein.

Before the present materials, compounds, compositions, kits, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

Reference will now be made in detail to specific aspects of the disclosed materials, compounds, compositions, articles, and methods, examples of which are illustrated in the accompanying Examples and Figures.

There are no GMP 3D printable, resorbable polymers available commercially. Sourcing is very difficult for the two materials that are available for research grade work: (1) polylactides (PL) and polycaprolactone (PCL). Bone regeneration, and that of many organs, requires that a resorbable, regenerative (e.g., fixation, suturing, sealing, stenting, or scaffolding) device degrade between 3-9 months. Currently available PLs degrade before 3 months and available PCL degrades in 3-5 years. The 3-9 month window is necessary because the initial bone or other tissue healing needs to remodel to become strong. Remodeling cannot occur if there is resorbable material remaining in the space where the newly formed tissue is found. Producing devices for the regeneration of other tissues (e.g., skin, blood vessel, colon/ bile duct, lung, liver, heart, muscle, etc.) will also require a resorption time frame in the 3-9 month time frame Polycondensation of dianhydrohexitols (isosorbide, isomannide and isoidide) and saturated aliphatic diacids (adipic, gluconic and succinic) is a clever way to synthesize bioabsorbable polyesters. These polymers have unique properties; they are particularly suitable for applications in the medical device field since their degradation products are readily metabolized. More specifically, the applications of these polymers may include surgical fixation and regenerative devices for blood vessel, bone, tendon, and ligament reconstruction. Current devices hold well during the healing period but then do not allow a return to normal strength of the regenerated tissue after the healing period without a second surgery to remove these inert (i.e., non-resorbable) fixation devices. Resorbable materials for surgical sutures, carriers for drug release, and functionalized (i.e., bioactivation of the surface or resorbing material) devices are another potential application. Forming of these materials by 3D printing is important where patient-specific devices are needed, such as in reconstructive surgery. Another application of these materials is as a vascular graft scaffold. These scaffolds must resist high pressure flow (e.g., arteries near the heart encounter stresses on the order of 15-30 dyne/cm$^2$ whereas flow in other tissues rarely causes flow stress exceeding 0.2 dyne/cm$^2$). Materials that can maintain sufficient flexibility, allow maturing stem cells to remain attached, and then reliably resorb as the blood vessel is regenerated, offer great potential as vascular graft scaffolds.
Polyesters Disclosed herein are crosslinkable polyesters. The polyesters can comprise (i) monomer units derived from sugar-based bicyclic diol (also referred to as sugar-based bicyclic diol moieties); (ii) monomer units derived from an unsaturated aliphatic diacid (also referred to as unsaturated aliphatic diacid moieties); and (iii) monomer units derived from a saturated aliphatic diacid (also referred to as saturated aliphatic diacid moieties). Optionally, the polyester can further comprise monomer units derived from one or more additional diols, monomer units derived from one or more additional diacids, or a combination thereof.

The monomer units derived from an ethylenically unsaturated aliphatic diacid can be present in an amount of from greater than 0 mole % to 40 mole % of the polyester (e.g., from 5 mole % to 20 mole % of the diacid monomer units). For example, in some examples, the monomer units derived from an ethylenically unsaturated aliphatic diacid are present in an amount of from greater than 0 mole % to 35 mole % of the polyester, such as from greater than 0 mole % to 30 mole % of the polyester, from greater than 0 mole % to 25 mole % of the polyester, from greater than 0 mole % to 20 mole % of the polyester, from greater than 0 mole % to 15 mole % of the polyester, from greater than 0 mole % to 10 mole % of the polyester, from greater than 0 mole % to 5 mole % of the polyester, from 0.5 mole % to 35 mole % of the polyester, from 0.5 mole % to 30 mole % of the polyester, from 0.5 mole % to 25 mole % of the polyester, from 0.5 mole % to 20 mole % of the polyester, from 0.5 mole % to 15 mole % of the polyester, from 0.5 mole % to 10 mole % of the polyester, from 0.5 mole % to 5 mole % of the polyester, from 2.5 mole % to 35 mole % of the polyester, from 2.5 mole % to 30 mole % of the polyester, from 2.5 mole % to 25 mole % of the polyester, from 2.5 mole % to 20 mole % of the polyester, from 2.5 mole % to 15 mole % of the polyester, from 2.5 mole % to 10 mole % of the polyester, or from 2.5 mole % to 5 mole % of the polyester.

In some embodiments, the polyesters described herein, when crosslinked, can produce a biocompatible material which degrades (bioerodes) in vivo within from 3 to 9 months following implantation. As such, the polyesters described herein can provide materials which degrade more slowly than conventional polylactides (which generally degrade within 3 months), but more rapidly than conventional polycaprolactones (which generally degrade over a period of years, if at all). Thus, the polyesters described herein can fulfill the need for biomedical-grade, resorbable, 3D printable, polymers for use in FDA-approved medical devices.

In some embodiments, the polyesters—when crosslinked—are bioerodible, i.e., they gradually hydrolyze, dissolve, physically erode, or otherwise disintegrate within the aqueous fluids of a subject's body. Generally, the polymers bioerode as a result of hydrolysis or physical erosion, although the primary bioerosion process is typically hydrolysis. However, in some embodiments, the polyester can be designed such that at least a portion of the crosslinked polyester remains in place (is not bioeroded) for at least 3 months following implantation in a subject. For example, in some embodiments, at least a portion of the crosslinked polyester (e.g., at least 10% by mass, at least 25% by mass, at least 50% by mass, at least 75% by mass, at least 80% by mass, or at least 90% by mass) remains polyester remains in place for at least 3 months (e.g., at least 4 months, at least 5 months, at least 6 months, at least 7 months, at least 8 months, at least 9 months, at least 10 months, at least 11 months, or at least 12 months) following implantation in a subject. In some embodiments, at least a portion of the crosslinked polyester (e.g., at least 10% by mass, at least 25% by mass, at least 50% by mass, at least 75% by mass, at least 80% by mass, or at least 90% by mass) remains polyester remains in place for from 3 months to 2 years (e.g., from 3 months to 1 year, or from 3 months to 9 months) following implantation in a subject.
Sugar-Based Bicyclic Diols Carbohydrate-based diols with a bicyclic structure are known in the art, and are interesting building-blocks for polyesters synthesis. Examples include dianhydrohexitols (also known as isohexides) and bicyclic diacetalized hexitols.

Isohexides are a family of alditols dianhydrides with a fused bis-tetrahydrofurane structure that are prepared by dehydration of aldohexitols. The isohexide coming from D-glucose (dianhydro-1,4:3,6-D-glucitol) is commonly known as isosorbide, abbreviated Is, and it is currently produced on industrial scale. Other isohexides include isoidide and isomannide.

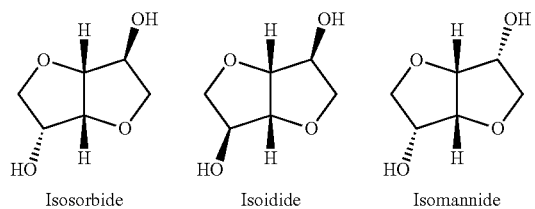

Isosorbide     Isoidide     Isomannide

In these last years, another family of based-carbohydrate bicyclic diols have emerged. This comprises among others, alditols and aldaric acids methylene diacetals with a structure made of two fused 1,3-dioxane rings. The bicyclic diacetalized hexitols derived from D-mannose and D-glucose (2,4:3,5-di-O-methylene-D-mannitol and -D-glucitol), abbreviated as Manx-diol and Glux-diol, are examples.

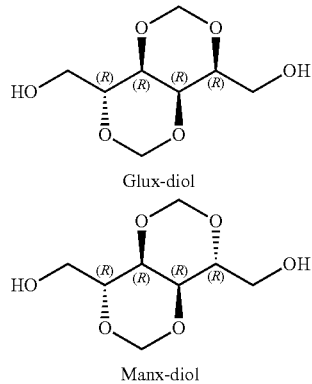

Glux-diol

Manx-diol

Additional Diols

When present, additional diols can include, for example, cycloaliphatic diols (e.g., having from 6 to 20 carbon atoms), aliphatic diols (e.g., having 2 to 20 carbon atoms, such as from 2 to 12 carbon atoms), and combinations thereof. Examples of additional diols include, but are not limited to, ethylene glycol, 1,3-propanediol, 1,4-butanediol; 1,5-pentanediol; 1,6-hexanediol; 3-methylpentanediol-(2, 4-), 2-methylpentanediol-(1,4-), 2,2,4-trimethylpentanediol-(1,3-), 2-ethylhexanediol-(1,3-), 2,2-diethylpropanediol(1, 3-), 1,3-hexanediol, 1,4-di(hydroxyethoxy)-benzene, 2,2-bis-(4-hydroxycyclohexyl)-propane, 2,2-bis-(3-hydroxyethoxyphenyl)-propane diol, neopentyl glycol; diethylene glycol; 1,8-octanediol; 1,10-decanediol; cis or trans-1,4-cyclohexanedimethanol and mixtures of cis and trans monomers; 2,2,4,4-tetramethyl-1,3-cyclobutanediol, triethylene glycol, 2,2-bis[4-(2-hydroxyethoxy)phenyl]propane; 1,1-bis[4-(2-hydroxyethoxy)-phenyl]cyclohexane; 9,9-bis[4-(2-hydroxyethoxy)phenyl]fluorene; 1,4:3,6-dianhydromannitol; 1,4:3,6-dianhydroiditol and 1,4-anhydroerythritol. In some embodiments, the additional diol moieties can be derived from ethylene glycol, 1,4-butanediol, 1,3-propanediol, neopentyl glycol, 1,4-cyclohexanedimethanol, or a combination thereof.

If desired, small amounts (e.g., less that 5 mole % of the diol monomer units, such as less than 1 mole % of the diol monomer units) of the monomer units derived from diols can comprise monomer units derived from alcohols with a functionality greater than 2 (e.g., trimethylopropane or pentaerythritol).

Unsaturated Diacids

In some embodiments, the unsaturated diol can comprise from 2 to 20 carbon atoms (e.g., from 2 to 12 carbon atoms, or from 4 to 12 carbon atoms) and include one or two double bonds. In some examples, the unsaturated diacid can be an α,β-ethylenically unsaturated diacid, for instance a diacid chosen from the group of fumaric acid, maleic acid, chloromaleic acid, itaconic acid, methylglutaric acid, mesaconic acid, citraconic acid, and combinations thereof.

Additional Diacids

Examples of saturated aliphatic diacids include unsubstituted, substituted, linear, and branched saturated aliphatic dicarboxylic acids having from 4 to 36 carbon atoms (e.g., from 4 to 24 carbon atoms, from 4 to 20 carbon atoms, from 4 to 16 carbon atoms, or from 4 to 12 carbon atoms). Specific examples of saturated aliphatic diacids include oxalic acid, malonic acid, dimethylmalonic acid, allylmalonic acid, succinic acid, methylsuccinic acid, glutaric acid, 2-methylglutaric acid, 3-methylglutaric acid, adipic acid, 3-methyladipic acid, 2,2,5,5-tetramethylhexanedioic acid, pimelic acid, suberic acid, azelaic acid, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, and the like and mixtures derived therefrom.

In some embodiments, the saturated aliphatic diacid can be from renewable origin. In some cases, the saturated aliphatic diacid can be adipic acid, suberic acid, azelaic acid, sebacic acid, brassylic acid, or a combination thereof.

Additional diacids include, but are not limited to, aromatic diacids (e.g., having from 6 to 40 carbon atoms, such as from 8 to 14 carbon atoms) and cycloaliphatic diacids (e.g., having from 5 to 40 carbon atoms, such as from 8 to 12 carbon atoms. Examples additional diacids include, but are not limited to, terephthalic acid, isophthalic acid, 1,4-naphthlenedicarboxylic acid, 2,6-naphthalenedicarboxylic acid, 2,7-naphthalenedicarboxylic acid, 1,4-cyclohexanedicarboxylic acid, cyclohexanediacetic acid, 5-sodiosulfoisophthalic acid, carbonic acid, sulfoisophthalic acid, 2,5-furandicarboxylic acid, 2,5-thiophenedicarboxylic acid, 3,4'- and 4,4'-diphenyl sulfide dicarboxylic acid, diphenyl-4,4'-dicarboxylic acid, naphthalenedicarboxylate, 3,4'- and 4,4'-diphenylsulfone dicarboxylic acid, 3,4'- and 4,4'-benzophenonedicarboxylic acid, 4,4'-methylene bis(cyclohexyl) dicarboxylic acid, trans-1,4-cyclohexanedicarboxylic acid, cis-1,4-cyclohexanedicarboxylic acid, cis- and/or trans-1,3-cyclohexanedicarboxylic acid, 4-cyclohexane-1,2-dicarboxylic acid, 2-ethylsuberic acid, 1,2-bis(4-carboxyphenoxy) ethane, 4,4'-methylene-bis(benzoic) acid, 4,4'-methylene-bis(cyclohexyl) carboxylic acid, 3,4-furandicarboxylic acid, 1,1-cyclobutane dicarboxylic acid, p-carboxyphenyl/oxybenzoic acid, ethylene(p-oxybenzoic acid), trans-4,4'-stilbenedicarboxylic acid, 2,2,3,3-tetramethylsuccinic acid, cyclopentanedicarboxylic acid, decahydro-1,5-naphthylene dicarboxylic acid, decahydro-2,6-naphthylene dicarboxylic acid, 4,4-bicyclohexyl dicarboxylic acid, dimer acid, resorcinoldiacetic acid, and 4,4'-bibenzoic acid and the like.

It should be understood that "dicarboxylic acids" includes the corresponding acid anhydrides, esters, and acid chlorides of these acids.

In the polyesters described herein, the mole percentages of the monomer units referred to herein equal a total of 100 mole %, with approximately 50 mole % being diol monomer units and approximately 50 mole % being diacid monomer units.

Resin Compositions

Also provided are resin compositions comprising the polyesters described herein. The resin compositions can include a polyester described herein and a photocrosslinker (also referred to as a photo-initiator).

The photocrosslinker can be biocompatible. The photocrosslinker can be activated by ultraviolet light (e.g., long wavelength ultraviolet light), light in the visible region, focused laser light, infra-red and near-infra-red light, X-ray radiation or gamma radiation. Preferably, the radiation is light in the visible or UV region and, more preferably, is blue light or UV light.

Non-limiting examples of the photocrosslinkers include biocompatible photocrosslinkers such as beta carotene, riboflavin, Irgacure 651 (2,2-dimethoxy-2-phenylacetophenone), phenylglycine, dyes such as erythrosin, phloxime, rose bengal, thonine, camphorquinone, ethyl eosin, eosin, methylene blue, riboflavin, 2,2-dimethyl-2-phenylacetophenone, 2-methoxy-2-phenylacetophenone, 2,2-dimethoxy-2-phenyl acetophenone and other acetophenone derivatives, and camphorquinone.

In some cases, the photocrosslinker can comprise a bisacylphosphine oxide, for example, bis(2,4,6-trimethylbenzoyl)phenylphosphine oxide (BAPO) brand name Irgacure® 819 (BASF (Ciba Specialty Chemicals)), or Bis(.eta.5-2,4-cylcopentadien-1-yl)-bis(2,6-difluoro-3-(1H-pyrrol-1-yl)-phenyl) titanium, brand name Irgacure® 784 (BASF (Ciba Specialty Chemicals)). Other Irgacure photo-initiators may also be used, e.g. Irgacure 184, Irgacure 250, Irgacure 754, Irgacure 819-DW, Irgacure 1173, Irgacure 2022, Irgacure 2100, Irgacure BP, Irgacure TPO, and Irgacure TPO-L. See Dispersions & Pigments North America, BASF, http://www.dispersions-pigments.basf.us/p02/US Web-Internet/pigments/en_GB/content/microsites/pigmentsdispersions/products/Irgacure.

Optionally, the resin composition can further include one or more of a co-crosslinker (e.g., vinylimidazole (VIM), N-isopropylacrylamide (NIPAM), or a combination thereof), a solvent (e.g., chloroform, dichloromethane, ethyl acetate, or a combination thereof), a surface functionalization agent (e.g., serum proteins or crystals such as beta tricalcium phosphate and/or hydroxyapatite to enhance cell attachment), a dye (e.g., oxybenzone (2-Hydroxy-4-methoxybenzophenone, also referred to as HMB), $TiO_2$, or a combination thereof), or a combination thereof. It may also be useful to include dispersants (e.g., Darvann) to increase buoyancy of resin constituents. It is possible that emulsifiers or materials that work like them will be useful depending on stereochemistry of the crosslinks that are desired.

In some embodiments, the resin compositions can include one or more components (e.g., a photo-initiator and/or dye-initiator) described in International Publication No. WO 2014/085809, U.S. Pat. No. 9,688,023, U.S. Patent Application Publication No. 2015/0314039, U.S. Patent Application Publication No. 2018/0126653, each of which is hereby incorporated herein by reference in its entirety.

In some embodiments, the resin compositions can include one or more co-crosslinkers such as a vinylether, vinylester, vinylamide, itaconate, enamine, or a mixture thereof. Examples of such co-crosslinkers are described in U.S. Patent Application Publication No. 2011/0269908, which is hereby incorporated herein by reference in its entirety.

Example vinylethers include monomers, oligomers and polymers having a vinylether moiety. Example of liquid vinylethers include mono (alcohol) functionalized vinylethers, for example ethyl vinylether, 4-hydroxybutyl vinylether, 2-hydroxyethyl vinylether, diethylene glycol monovinyl ether or 4-(hydroxy methyl)cyclohexyl methyl vinyl ether (1,4-cyclohexanedimethanol vinyl ether); di alcohol functionalized vinylethers, such as for example butanediol divinylether, diethyleneglycol divinylether, triethyleneglycol divinylether, tetraethyleneglycol divinylether, polyTHF™ 290-divinylether, hexanediol divinylether, 1,4-cyclohexanedimethanol divinylether; tri alcohol functionalized vinylethers, for example trimethylol propane trivinylether, 1,2,4-trivinylcyclohexane; and mono amino functional vinylethers, for example 3-amino propyl vinyl ether. Vinylethers may be prepared from a dimethylester and a hydroxyfunctional vinylether under formation of a vinyletherester.

Examples of amorphous or semi-crystalline vinyl ethers include vinylether urethanes, vinylether polyester urethanes, vinylether ureas and vinylether polyester ureas. In order to prepare a vinylether urethane, isocyanate may be reacted with a hydroxyfunctional vinylether and/or a polyalcohol.

To prepare a vinylether polyester urethane, an isocyanate may be reacted with a hydroxyfunctional vinylether and a hydroxyfunctional polyester (for example a polyester as described above). These reactions are customary, generally known polyaddition reaction of a (poly)isocyanate with a (poly)alcohol in the presence of, if needed, a catalyst and other additives.

Examples of vinylethers also include vinyletherpolyesters, which for example can be prepared from acid functional polyesters (for example as exemplified herein) with hydroxyfunctional vinylethers. Of course, it is also possible to prepare vinyletherpolyesters via transesterification of hydroxyfunctional or alkylfunctional polyesters with hydroxyfunctional vinylethers.

Vinylesters include monomers, oligomers and polymers having a vinylester moiety. Examples of vinylesters include mono functional vinylesters, for example stearic acid vinylester, palmitic acid vinylester, benzoic acid vinylester, lauric acid vinylester, hexanoic acid vinylester, pivalic acid vinylester, oleic acid vinylester, methacrylic acid vinylester, decanoic acid vinylester, bromo acetic acid vinylester, myristic acid vinylester, valeric acid vinylester, nonanoic acid vinylester, heptanoic acid vinylester, phenyl acetic acid vinylester, maleic acid (di)vinylester, undecanoic acid vinylester, iodo acetic acid vinylester, 2-naphthoic acid vinylester, 3-chloro-butyric acid vinylester, 4-chloro-butyric vinylester and 2-chloro-butyric acid vinylester; di functional vinylesters, such as for example adipic acid divinylester, fumaric acid divinylester, sebacic acid divinylester, phthalic acid divinylester and terephthalic acid divinylester; and polyfunctional vinylesters, for example trimellitic acid trivinylester.

Itaconates include monomers, oligomers, and polymers having an itaconate moiety. Examples of liquid itaconates include diethylitaconate, dibutylitaconate, etc. Examples of solid itaconates include dimethylitaconate. Since resins containing unsaturations based on itaconic acid can homopolymerize, a resin containing itaconic acid based unsaturations may be used in combination with an oligomer or polymer containing itaconic acid based unsaturations as a co-crosslinker.

In some embodiments, the co-crosslinker can comprise 1-vinylimidazole, N-isopropylacrylamide, maleic anhydride, N-vinylpyrrolidone, or a combination thereof.

In some embodiments, the co-crosslinker can comprise a sugar-based co-crosslinker, such as a sugar-based co-crosslinker defined by Formula I or Formula II below

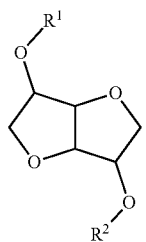

Formula I

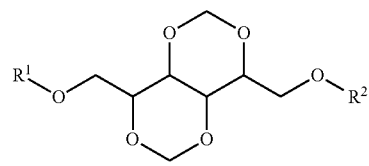

Formula II wherein $R^1$ and $R^2$ are each independently selected from H, C1-C6 alkyl, and an ethylenically unsaturated moiety, with the proviso that at least one of $R^1$ and $R^2$ is an ethylenically unsaturated moiety.

The term "ethylenically unsaturated" is used herein to mean a moiety that includes at least one polymerizable carbon-carbon double bond (which can be mono-, di-, tri-, or tetra-substituted). Suitable ethylenically unsaturated moieties are known in the art, and include vinyl, allyl, acryloyl, methacryloyl, ethacryloyl, styryl, 3-vinylbenzyl, 4-vinylbenzyl, 3-vinylbenzoyl, 4-vinylbenzoyl, 1-butenyl, 1-propenyl, isobutenyl, isoprenyl, cyclohexyl, and cylcopentyl moieties. In some embodiments of Formula I and Formula II, $R^1$ and $R^2$ are each independently selected from H, C1-C6 alkyl, and an ethylenically unsaturated moiety selected from vinyl, allyl, acryloyl, and methacryloyl, with the proviso that at least one of $R^1$ and $R^2$ is an ethylenically unsaturated moiety.

In some embodiments, the co-crosslinker can be defined by Formula IA, Formula IB, or Formula IC

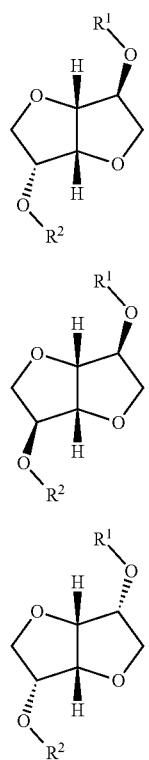

Formula IA

Formula IB

Formula IC wherein $R^1$ and $R^2$ are each independently selected from H, C1-C6 alkyl, and an ethylenically unsaturated moiety, with the proviso that at least one of $R^1$ and $R^2$ is an ethylenically unsaturated moiety. In some of these embodiments, $R^1$ and $R^2$ are each independently selected from H, C1-C6 alkyl, and an ethylenically unsaturated moiety selected from vinyl, allyl, acryloyl, and methacryloyl, with the proviso that at least one of $R^1$ and $R^2$ is an ethylenically unsaturated moiety.

In some embodiments, the co-crosslinker can be defined by Formula IIA or Formula IIB

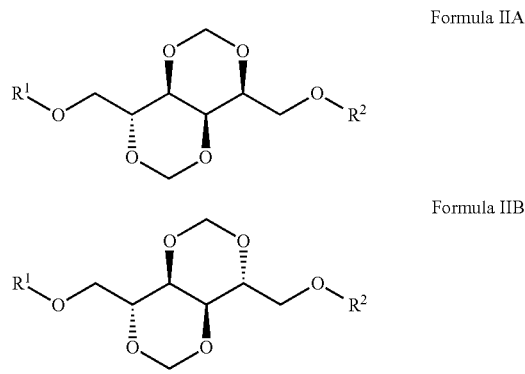

Formula IIA

Formula IIB wherein $R^1$ and $R^2$ are each independently selected from H, C1-C6 alkyl, and an ethylenically unsaturated moiety, with the proviso that at least one of $R^1$ and $R^2$ is an ethylenically unsaturated moiety. In some of these embodiments, $R^1$ and $R^2$ are each independently selected from H, C1-C6 alkyl, and an ethylenically unsaturated moiety selected from vinyl, allyl, acryloyl, and methacryloyl, with the proviso that at least one of $R^1$ and $R^2$ is an ethylenically unsaturated moiety.

In some embodiments, the co-crosslinker can comprise one or more of the following

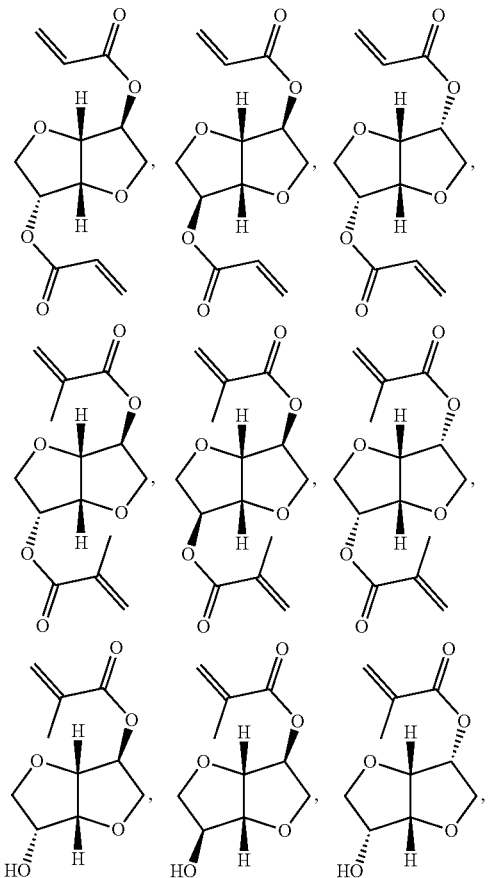

-continued

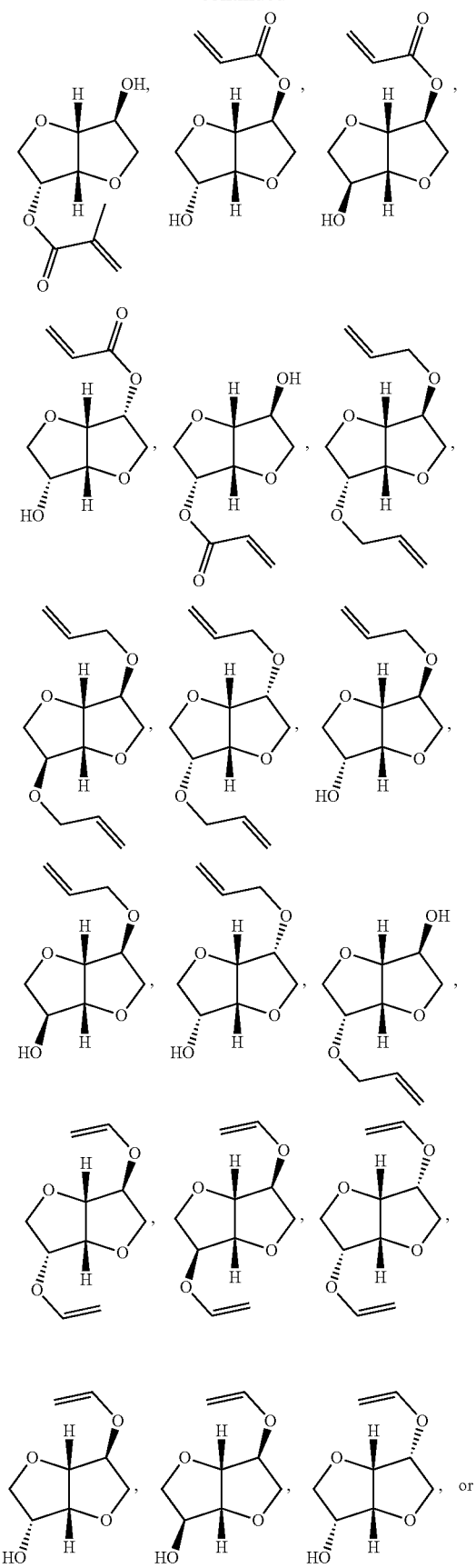

-continued

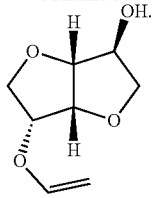

Methods of Making

The polyesters described herein can be produced by any suitable method. In some cases, the polyesters can be formed using enzymatic catalysis (as described below). Example polyesters were formed using diesters of fumaric or glutaconic acids, mixed with a diester of adipic acid, and with diols such as isosorbide or isomannide, (and optionally another diol such as 1,4-butanediol or 1,6-hexanediol).

These products exhibited the inclusion of 5-10% of unsaturated monomers, rendering a product that could be polymerized by photo- and thermal-crosslinking, as well as facilitating Michael addition adducts. Their molecular weight ranged from 2 to 16 kDa, PDI close to 2, low degree of crystallinity and low glass transition. By modifying parameters such as the unsaturation degree, chain length of the diester (diacids) used, and the resulting polymer's molecular weight, and others, key medical parameters such as device stiffness, strength, and resorption rate, can be controlled.

Methods of Use and Articles of Manufacture

The polyesters and resin compositions described herein can be used in additive manufacturing methods. In some cases, the polyesters and polymeric compositions described herein can be used in a thermal additive manufacturing process (e.g., a process in which thermally-induced crosslinking of the polyester forms the workpiece). In other cases, the polyesters and polymeric compositions described herein can be used in an additive manufacturing process based on photocrosslinking (e.g., a process in which light-induced crosslinking of the polyester forms the workpiece). In certain cases, the polyesters and polymeric compositions described herein can be used in a digital light processing (DLP) additive manufacturing, including those described in U.S. Pat. No. 9,688,023, U.S. Patent Application Publication No. 2015/0314039, U.S. Patent Application Publication No. 2018/0126653, each of which is hereby incorporated herein by reference in its entirety.

In conjunction with photocrosslinking methods, any suitable light source may be used, such as a single point laser, DMD chip, or an LCD projector). In other embodiments, "flashing" light can be used to induce hydrogel formation. The polyesters can be electrospun, injected into transparent molds, or formed as thin films or sheets produced by flashing light at a layer of liquid resin, etc.

The polyesters described herein can be formed into articles of manufacture, for example, using the additive manufacturing methods described herein. Alternatively, the polyesters may be formed into articles of manufacture using other suitable methods (e.g., casting, molding, etc). In some embodiments, the article can comprise a tissue engineering scaffold or medical implant. For example, the article can comprise a bone scaffold, a surgical fixation device (e.g., for bone, tendon, ligament reconstruction), a vascular graft scaffold, a surgical suture, and/or a drug eluting carrier for controlled drug release By way of non-limiting illustration, examples of certain embodiments of the present disclosure are provided below.

EXAMPLES

Example 1. Photocrosslinking-Based 3D Printing of Unsaturated Polyesters from Isosorbide Overview Clinically used tissue-engineered devices are few and far between. The search for biocompatible materials has been a great focus for the field for the past 30 years. The ones that exist are hard to work with when manufacturing patient-specific shapes with complex external and internal pore geometries because of their material and mechanical properties. Photocrosslinkable polymers have arisen as a potential 3D printable solution for this problem. In this example, a new sugar-based polymer, isosorbide-derived polyester, is evaluated as a potential resorbable material for use in medical devices and other applications.

Isosorbide-derived polyesters containing different quantities of double bonds were synthesized to allow the polyester to be crosslinked and/or functionalized. This was accomplished by including varying amounts of an unsaturated monomer within the polyester. Three resin formulations with different quantities of double bonds available (5, 12 and 17%) were used. After initial thermal and photocrosslinking studies, isosorbide-derived unsaturated polyesters were then mixed with a photoinitiator, co-crosslinker, and solvent to form a 3D printable resin formulation. Thin films of that resin were then cured using a Digital Light Projection (DLP) printer and analyzed. An attempt was made to modulate the cured thickness by adding HMB as a photo-attenuator. The 3D printing success and tensile green strength was then assessed for the three resin formulations.

Unsaturated polyesters were successfully printed from isosorbide with a DLP printer when enough double bonds were present to facilitate crosslinking and curing of the material. Finally, thin films were seeded with fibroblasts following the ISO 10993-5 protocol. These coupons were found safe (i.e., non-cytotoxic and biocompatible), suggesting these materials can be used to prepare resorbable implants for use in tissue engineering.

Background

In this example, an isosorbide-derived polyester is described which shows promise as a scaffold substrate for tissue engineering (e.g., bone tissue engineering). In this example, it is demonstrated that the sugar molecule, isosorbide, can be prevented from degrading immediately in solution through light-induced crosslinking. Other potential bone scaffolding materials have shown high compressive strength but are brittle (e.g., poly(propylene fumarate)). In contrast, crosslinked isosorbide-derived polyesters can exhibit high tensile strength.

Bone regeneration and remodeling physiology require that resorbable devices ideally degrade in during a time span of between 3-6 months. This allows the bone to fully heals without obstructing this process. This is necessary because the initial bone healing response, resulting in a disorganized callus, needs to be remodeled by osteoclastic activity to become strong. Remodeling cannot occur if it encounters un-resorbed material. Unresorbed material would form a barrier to this process. Producing devices for the regeneration of bone and other tissue types (e.g., skin, lung, liver, heart, muscle, etc.) can utilize different resorption rates in ranges that suit the tissue's own regeneration (healing) and remodeling process.

Polycondensation of dianhydrohexitols (isosorbide, isommanide, and isoidide) and saturated aliphatic diacids (adipic, gluconic and succinic) provides a strategy for the synthesis of bioabsorbable polyesters. These polymers have useful properties; they are suitable for applications in the medical device field since their degradation products are readily and locally metabolized. Additionally, the applications of these polymers potentially include surgical fixation devices for bone, tendon, and ligament reconstruction.

Isosorbide (1,4:3,6-dianhydro-D-glucitol) is a bioderived and biodegradable dianhydrohexitol compound qualified by US Food and Drug Administration as "generally recognized as safe" (GRAS). The bicyclic diol also shows thermal and chemical stability; it is non-toxic, biodegradable, and can be used in copolymerization reactions. If polymerized into an unsaturated polyester, the resulting sugar-based polymer can exhibit high tensile strength and flexibility. The polymer can also be photocured.

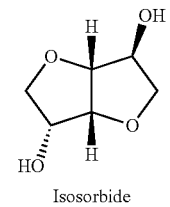

Isosorbide

Isosorbide can be obtained stereoselectively starting from starch. Enzymatic starch hydrolysis leads to D-glucose production. D-glucose hydrogenation process followed by sorbitol dehydration leads to isosorbide formation. Isosorbide has a stereochemistry in wedge shape, composed of two dihydrofuranoid rings. There is a hydroxyl group at C2 in exo-configuration, and a hydroxyl group at C5 in endo-configuration. When in an endo-configuration, hydroxyls are generally less reactive than when in an exo-configuration. The polycondensation of dianhydrohexitols (e.g., isosorbide) and (saturated and/or unsaturated) aliphatic diacids provides a convenient route to access bioabsorbable polyesters.

The exploration of isosorbide polyesters and the search for new materials was motivated by a desire to go beyond the use of petroleum-based materials. However, it was noticed that the applications of these isosorbide polymers can be diverse and interesting due to their biocompatible characteristics. Unsaturated isosorbide polymers can be very promising in terms of biomedical applications because they can be 3D printed, giving biocompatible and biodegradable scaffolds.

In this example, photocurable polyesters were synthesized and printed. The C=C bonds allow for radical reactions between the polymer and crosslinkers upon exposure to light. In this way, the initially liquid material becomes a solid film upon photocrosslinking. Further, polyesters are known to undergo chemical hydrolysis inside the body. As such, these polymers are biocompatible and biodegradable.

In terms of regenerative medicine, there are two types of typical cleavage in the biodegradation process: hydrolytic and enzymatic. In the human body, composed mostly of water, hydrolytic cleavages are important. Ester bonds are common moieties which can undergo hydrolysis. The hydrolysis of the ester bonds in the polyester polymer chain can leads to small molecules that can be excreted from the body.

Therefore, isosorbide polymers are biomedically interesting materials since their degradation byproducts are readily metabolized.

The ability to photo-cure this material makes 3-D printing an option for these polyester resin formulations. Development of additive manufacturing methods for this material may be able to fill a need in the medical implant industry by enabling specific parts to be manufactured for bone scaffolding, surgical fixation devices for bone, tendon, ligament reconstruction, vascular graft scaffold, surgical sutures, and carriers for controlled drug release. Using Digital Light Processing (DLP), a mask can be projected that is computer-generated by slicing the desired object to print into 50 μm layers in software. The depth of these slices can be varied to determine the best elevator movement in the Z direction. X and Y for 3D printing. Laser projection can be controlled by a micromirror chip that reflects the UV light to the clear vase of the resin vat, where it cures the resin crosslinking it. There can be some over penetration, which allows each new layer to attach to the previous one in a process called interlayer stitching. After the new layer has been stitched to the previously layer, the elevator will move again and the next mask will be projected. Most products used for these purposes currently are made from non-resorbable materials such as ceramics, polymers, and metals. The polyesters described herein can fill a much-needed void for bio-implantable materials that are degradable, softer, more flexible and able to be used for manufacturing via 3D printing.

and weighed in a Glove Box under $N_2$ atmosphere (it is a very hygroscopic compound). Adipic diethyl and Fumaric acid (Sigma-Aldrich) were used as received. CAL-B (Novozyme; specific activity 10,500 PLU/g) is the Lipase B from *Candida antarctica* (NZ 435) immobilized in microporous resin Lewatit 1600. Hydroquinone (BHerzog) was used as received.

Synthesis of diethyl fumarate. 23.83 g of fumaric acid was added in a round-bottomed flask with 120 mL of anhydrous ethanol. The mixture was heated under reflux over 15 minutes. Then, 5 mL of sulfuric acid was added dropwise, followed by 100 mL of toluene and 15 minutes of heating under reflux. Another 15 mL of sulfuric acid was added dropwise gently and the mixture was heated under reflux during more 30 minutes. The system was cooled at room temperature and neutralized with $NaHCO_3$ saturated solution. Organic phases were extracted and the aqueous phases were washed with toluene. After combining organic phases, the mixture was dried with $Na_2SO_4$ over 24 hours. The diethyl fumarate was concentrated by rotary evaporation and then purified by distillation under reduced pressure.

Synthesis of unsaturated polyesters. Polycondensation reactions of isosorbide with diethyl adipate and fractions of diethyl fumarate were carried out using the copolymerization reaction shown in Scheme 1.

Scheme 1. co-polymerization reaction used to produce poly(isosorbide adipate-co-isosorbide fumarate).

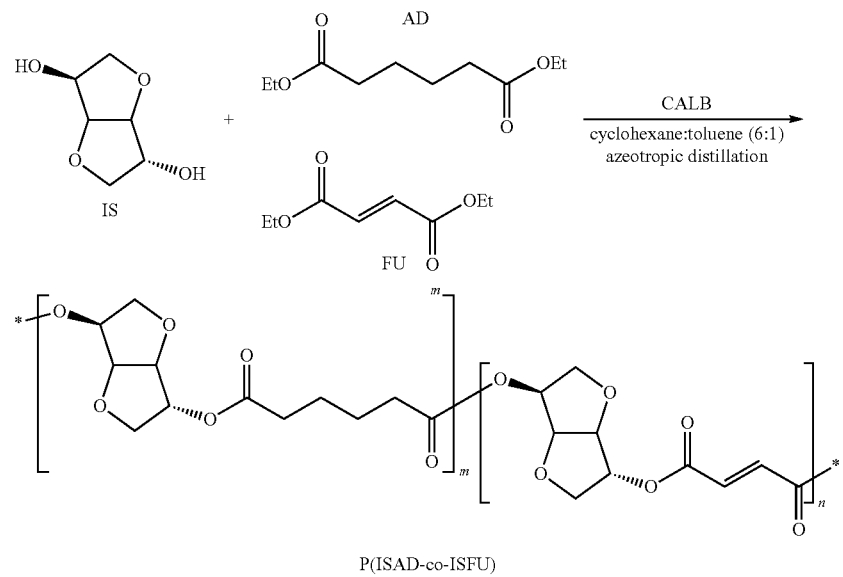

P(ISAD-co-ISFU)

Materials and Methods

Isosorbide purification. The isosorbide was recrystallized twice from ethyl acetate, using an external oil bath at 50° C., and dried under vacuum in the presence of phosphorus pentoxide until reaching constant mass. Their final purity was determined by Gas Chromatography-Mass Spectrometry (GC-MS—QP2020—Shimadzu with the column BPX5 ((5%-Phenyl)-methylpolysiloxane)—30 m.).

Before use, all solvents used (Merck) were dried and distilled. Isosorbide (Sigma-Aldrich) was recrystallized twice from ethyl acetate, dried under vacuum for 72 hours To synthesize an unsaturated isosorbide polymer, isosorbide (IS), diethyl adipate (AD) and diethyl fumarate (FU)—molar ration IS:AD:FU (10:9.5:0.5)—were added into a flask containing cyclohexane:toluene (6:1) mixture. CAL-B (10% relative to total monomer mass) was employed as the catalyst and hydroquinone (1% w/w) was used to avoid radical addition reactions in double bonds during the copolycondensation. To produce 30 g of polymer, the amount of reactants was calculated in relation to 70 mmol of isosorbide and 270 ml of the same solvent mixture. The flask was attached to a Dean Stark apparatus that contained 4 A molecular sieves for byproduct removal. The Dean Stark was attached to a condenser. The molecular sieves were replaced with fresh dried molecular sieves every 24 h and the solvent level was kept constant. The reaction was magnetically stirred and heated at 90° C. sing an external oil bath. After 7 days of reaction, the solvent was removed, while chloroform was added and the enzyme was filtered. The product was concentrated, by rotary evaporation, removing chloroform.

Three resin formulations were obtained this way, corresponding to different double bonds inserted 5% (A), 12% (B), and 17% (C). The unsaturation content in polyester chains was evaluated by $^1$H NMR by relation integral values of methylene groups from adipate and alkenyl groups from fumarate.

Figure 1:
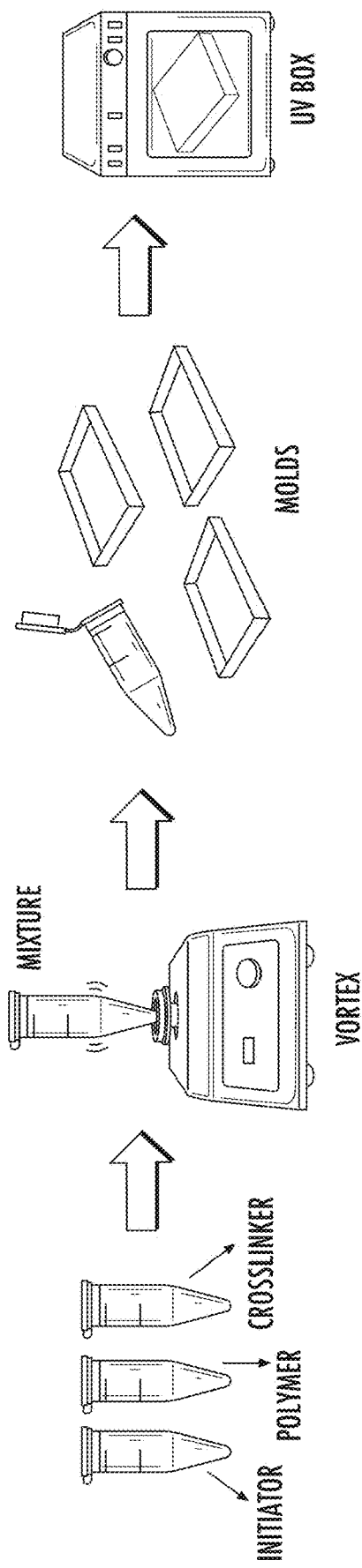
FIG. 1 is a schematic representation of photocrosslinking tests performed in Example 1.

Initial thermal and photocrosslinking studies. Isosorbide polymer was mixed with chloroform as a solvent and stirred overnight. The polymer was mixed with 3% BASF Irgacure 819 (BAPO) and 35% (w/w) crosslinker (1-vinylimidazole, N-vinylpyrrolidone or N-isopropylacrylamide) to form a photocurable resin. All solutions were mixed with a vortex. The solution was then transferred to cylindric (2.5 cm of diameter and 1.5 cm of height) Teflon molds, and subjected to photocrosslinking by UV light. A schematic representation of this process is shown in FIG. 1. The material was then tested at 30, 45 and 60 minutes in standard power UV light to induce crosslinking. It is worth noting that the UV light (LuzChem®) operates with radiance near to 4.6 mW/cm$^2$ in the peak of wavelength 254 nm.

Photocurable resin formulation. Three resins of varying molecular weights were used with 5% (A), 12% (B), and 17% (C) double bonds inserted respectively, using 58% w/w of the resin by weight. VIM (1-vinylimidazole), (Sigma-Aldrich, MO) was used as co-crosslinker at a 32% w/w; as well as 3% Irgacure 819 (BAPO) (BASF, NJ) as photoinitiator and dissolved in ethyl acetate as the solvent at 7% w/w. Isosorbide polymer was mixed with the ethyl acetate/photoinitiator pack and stirred overnight in a sealed container.

Thin film curing and 3D printing methods. Both thin film curing and 3D printing of these resins using a cDLP 3D printer are performed using an EnvisonTEC® micro® printer (Dearborn, MI, see FIG. 7). This system was used to measure tensile green strength. This device utilizes 405 nm light and a 450 mW/cm$^2$ intensity measured with a RM 12 radiometer with a VIS-B sensor (Dr. Grobel, Ettlingen, GER), much different than the initial photo-crosslinking light source. Thin-film measurements were also performed as explained below.

Microscope slides were measured previously and recorded. About 7 drops of resins were set on top of the base slide and then cured in the printer for the assigned time using 1.0×1.0 cm projected squares. Two separate time points were investigated for these thin film cure tests: 60 and 150 seconds. Once the curing was finished, the slide was gently wiped to take uncured material off, the top cover slide was placed over the cured part and this sandwich was measured with a calliper (Mitutoyo Absolute Digimatic, Mitutoyo, IL). After subtracting the initial slides thicknesses, we get the cure depth for the thin films. A total of 8 samples per time point were recorded.

Film thickness control. HMB (Oxybenzophenone) (Sigma, St. Louis, MO) was added to act as well as a light attenuator (reducing thin film thickness). Cure tests were repeated at 30, 60, 90 and 120 seconds, measured utilizing the same method as described above for the thin film curing. This was tested only with resin Formulation A.

Figure 2:
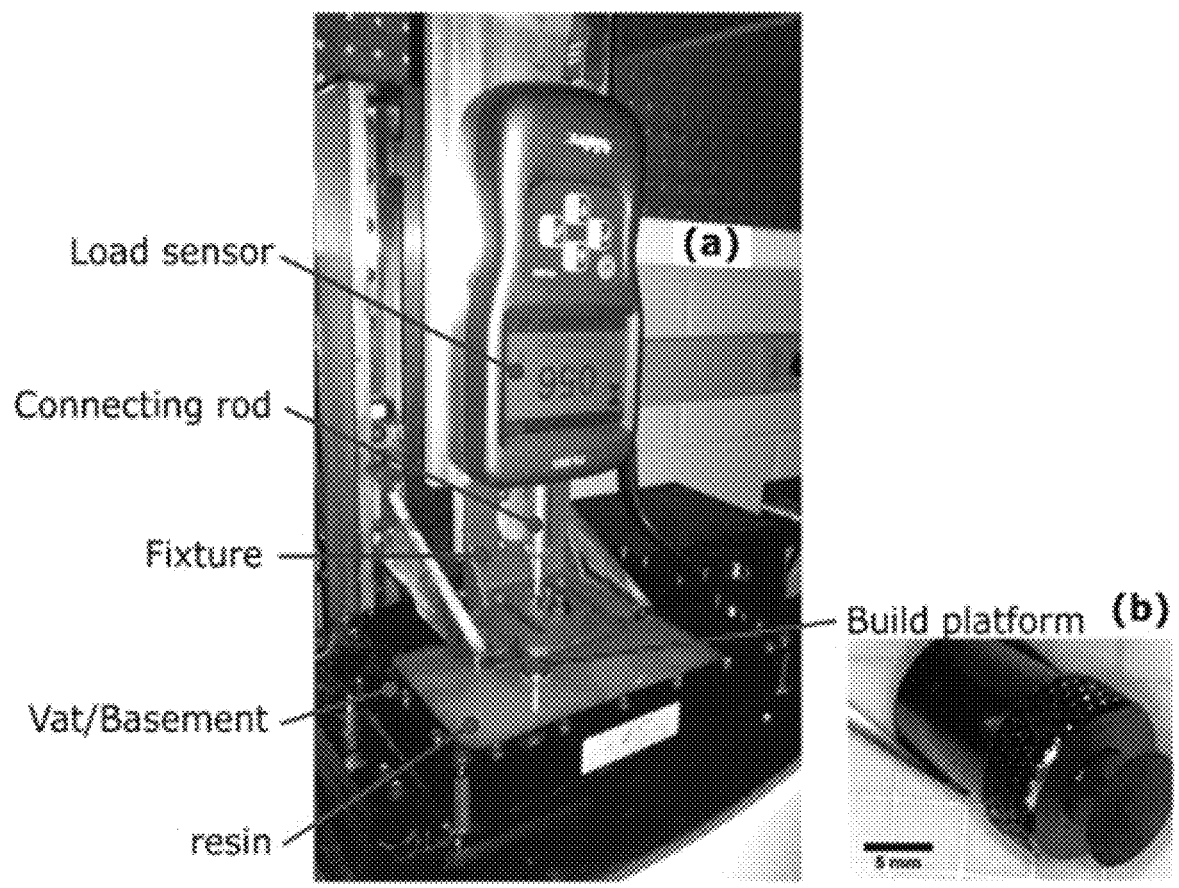
FIG. 2 is a schematic representation of methods for measuring the separation force and green strength in an EnvisionTEC (Dearborn, MI) µicro 3D printer. The load sensor and montage can be seen in panel (a). The build platform as it is printed can be seen in panel (b). The build job schematic can be seen in panel (c), where after a burn-in plate consisting of a wide base curing with 90 s for 3 layers and then 2 more with 60 s for anchorage, 20 layers of a 1 mm diameter were printed at a 60 s exposure time. Next, layers which increase in diameter after every 3 layers were printed in a matter of 0.5 mm using 60 s exposure time. The separation force was tracked in real-time until the part failed by breaking from the 1 mm post. This fracture occurred when the separation force surpassed the material's mechanical properties.

Mechanical testing. Resin formulations that exhibit thin film thicknesses of 150-250 µm can be 3D printed without an attenuator under our conditions in the EnvisonTEC® printer; however, some resins were well above that thickness. The green strength of these 3D printed resin mixtures was investigated by using a load sensor that holds the build platform. A very small build plate was first coated with a "burn-in" patch of isosorbide. That burn-in patch acts as an anchor and support for the next 20 masks (layers) of 50 microns each to create a 1 mm diameter post. Then 3 consecutive layers were projected with increasing diameters of up to 8 mm to test the cured resin's tensile strength. This also shows that the resin can be properly 3D printed by joining the layers during the cDLP 3D printing process. The tensile green strength sensor set up and the print visualization is shown in FIG. 2.

Cytotoxicity. Per the ISO Standard 10993-5, 8 samples of 10 mm$^2$ thin films were printed (4 for resin B and 4 for resin C) employing the same samples obtained from the printability tests, transferred to PBS, and left soaking for 5 minutes. This step was repeated 3 times. Then they were autoclaved in the liquid cycle for 30 minutes at a temperature of 121° C. A total of 25,000 murine L929 American Type Culture Collection (ATCC, Rockville, MD, USA) fibroblasts were counted manually and seeded on an isosorbide thin film. The seeded thin films were then placed in a low attachment well for culture in Dulbecco's Modified Eagle's Medium (DMEM; Gibco, Walthman, MA, USA) supplemented with 10% horse serum, 1% L-glutamine, 1% sodium pyruvate, 50 U/mL penicillin and 50 ug/mL streptomycin (HyClone, Logan, UT, USA).

Samples were kept at 37° C. and 5% $CO_2$ atmosphere for three days. After 72 hours, cell proliferation was recorded using the PrestoBlue® (Invitrogen, MA, USA) assay and the number of cells present was calculated using a standard curve. Control groups included negative controls, 4 wells grown with complete DMEM for 72 hours as positive controls, and 4 samples per resin formulation. Effluent samples were collected in triplicate and measured as per the assay's instructions. Results were reported as average total cells per well.

Statistical Analysis. Quantitative data is shown as average±standard deviation. Statistical analysis was performed by using GraphPad® Prism® 7.o, using two-way ANOVA with Turkey's multiple comparisons for FIG. 3, and ordinary one-way ANOVA with multiple comparisons for FIG. 4. Statistically significant values were defined as a p-value of <0.05. Cure tests were done with an n=8, cytotoxicity with an n=4. Legends are as follows ns=non-significant, *=p<0.05, =<0.01, *=<0.001 and ****=<0.0001.

Results

Figure 3:
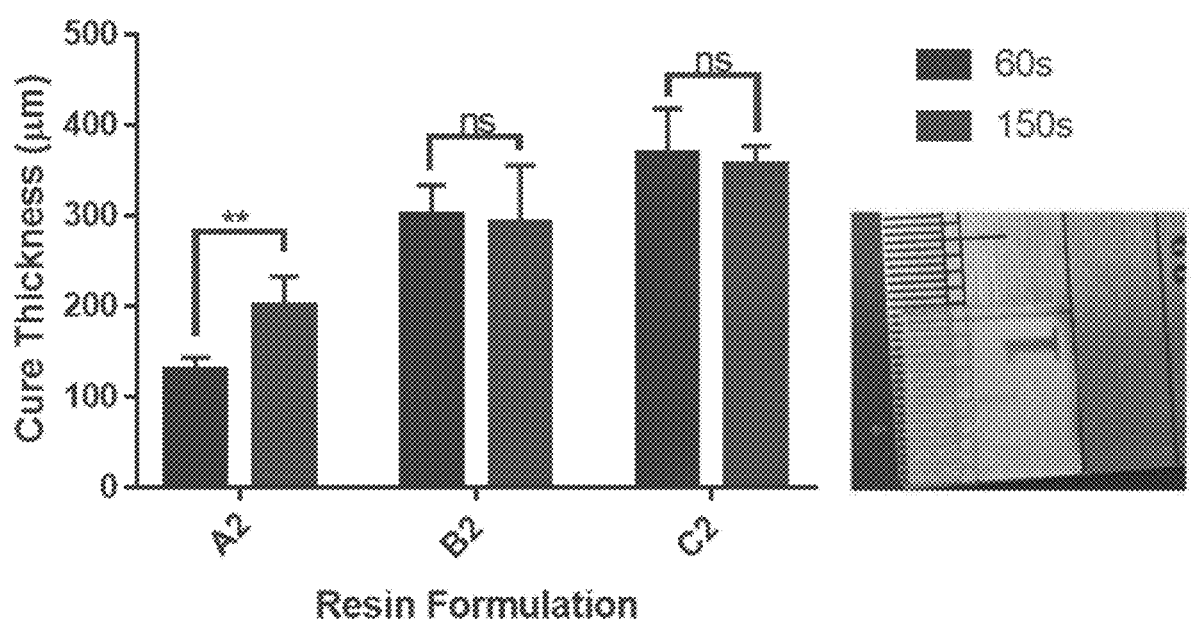
FIG. 3 is a graph showing the cured thickness of resins A, B, and C. (5%, 12%, and 17% double bonds respectively)

Thin films were cured to measure the cure depth of the different resins without a light attenuator. Resins B and C were fully photo-cured at both exposure times. Resin A did show a difference, but the photocrosslinking was found to be insufficient as the parts were not fully cured. The resin A thin films immediately dissolved in phosphate-buffered saline solution. These results are shown in FIG. 3.

After noting that the droplets were fully cured, HMB was added as a photoattenuator to control the cure depth for every layer. This was found to improve the resolution for printed parts. As such, the inclusion of a photoattenuator can aid in optimizing 3D printing processes. Resin A was used for the graph shown in FIG. 4.

Knowing that the resin formulations exhibit appropriate curing thickness, the mechanical properties of the materials were tested. While no light attenuator was used in these studies, resins B and C were able to produce a 3D printed piece, that correlated quite well with the double bonds available to the resins. Increasing the percentage of double bonds improved the mechanical properties of the printed pieces. Resin A did complete a burn-in patch at 90 s, as witnessed by the force spikes seen in the first part of the curve (burn-in patch at 90 seconds), but the part failed to print once the layers were printed at 60 seconds per layer. It is important to note that resin B started to fail during the print, as seen in both the graph showing positive force and the printed part with poor resolution. Resin C printed fully and the part was recovered as shown in panel C2 in FIG. 5. Resin B shows a green tensile strength of 123.79 Pa although the geometry was already partially failing while resin C formulation showed a tensile strength of 108.59 Pa with much improved geometric accuracy. The recovered parts and their respective force plots can be seen in FIG. 5.

The force plots for all the resins show that there's an increased separation negative force at the beginning where the anchoring and support burn-in masks were constructed, corresponding to the force it takes to separate the printed layer from the basement where the mask was projected. These were done in 3 masks of 90 seconds and 2 masks of 60 seconds each. Resin A failed to 3D print once the 1 mm diameter masks were projected. The force plot remains stable after this as there's no part being printed that exerts any force. For resins B and C, the higher amount of double bonds available correlates with better attachment (stitching) from one mask projection (i.e., 3D printing one layer by cDLP) to the next. This translates into a 3D printed part. The negative forces can be seen increasing with the increasing diameter of the masks in sets of 3. The positive spikes in the graphs can be explained as the force recorded once the build platform elevates enough to allow for the resin to flow back in and then compresses this uncured fluid. After the parts are printed, the plot returns to baseline as no more masks are being projected.

The thin films from the cure depth studies were then recovered by scraping them off the microscope slides that held them, then washed 3 times in PBS. These were autoclaved and kept sterile until the seeding with murine fibroblast cells in low attachment well plates. The viability assay was then run on days 0 and 3 and graphed against a standard curve showing viability at day 3. The drop in cell count from day 0 to day 3 can be accounted by the low attachment well plates where cells that didn't attach to the isosorbide proceeded to die, but the ones that attached to the films survived. FIG. 6 shows the results of the cytotoxicity assay.

Discussion and Conclusion

The search for resorbable polymers that can be used for bone tissue engineering and regeneration of other tissues has largely focused on polymers with rapid resorption times, such as polylactides (within 3 months) or slow resorption rates (e.g., polycaprolactones) which can take years to resorb (if they resorb at all). Isosorbide provides a material that has appropriate green tensile strength, and this characteristic can aid in providing new uses for the material as scaffolding and other medical devices to be implanted. Isosorbide polyesters can designed to be resorbed in vivo in a period of 3 to 9 months and can fulfil the need for a biomedical-grade, resorbable, 3D printable polymer for use in FDA-approved medical devices. It is important to note that the 3-month minimum resorption period is important for materials that serve as a guide the infusion of new tissue through a 3D printed pore geometry. It is also expected to facilitate remodeling, as it is expected to degrade in the key window of 3-9 months.

Further, these materials can be used in a 3D printing processes. For that purpose, continuous Digital Light Processing (cDLP) was used for the projection of UV light. 3D printing, also referred to as additive manufacturing, opens the possibility of controlling both mechanical properties and geometry. Isosorbide can be 3D printed with a high level of accuracy to produce a biocompatible material which is resorbable in the window needed for a tissue engineering scaffold.

Example 2. Synthesis and Photocrosslinking of Unsaturated Polymers Derived from Isosorbide for 3D Printing Applications As shown in Scheme 1 above, isosorbide unsaturated polyesters were prepared by the copolymerization between saturated diester (diethyl adipate, AD) and unsaturated diester (diethyl fumarate, FU). The photocrosslinking capability of the material from polyester solutions containing photoinitiator (BAPO) and different crosslinkers (NIPAM, NVPM, NVPD, EMA, VIM), was tested after irradiation with UV, at 410 nm, for 1 and 5 min. The unsaturated polyesters thus formed were 3D printed with a cDLP printer (EnvisonTEC® μicro® printer—Dearborn, MI, $\lambda$=405 nm and radiance of 450 mW/cm$^2$). Resins formulations were prepared with polymers, VIM, BAPO, and ethyl acetate. Two different times were investigated: 60 and 150 s.

Poly(isosorbide adipate-co-isosorbide fumarate), P(ISAD-co-ISFU), yielded unsaturated polymers with Mw values in the order of 4000-5000 Da (confirmed by GPC). Isosorbide polyesters show 5 and 12% of double bonds (FU:AD). All the structures were confirmed by $^1$H NMR. When mixed with photoinitiator (BAPO) and crosslinkers, after UV exposure ($\lambda$=410 nm) over 1 and 5 minutes, the acrylated resins produced films (FIG. 8). None of these films solubilized after immersion in chloroform. As shown in FIGS. 9A and 9B, depending on the crosslinker, the swelling range varied from 70% to 90% and the gel fraction varied from 50% to 92%. As shown in FIG. 10, the polymer could be 3D printed.

Example 3. Mechanical Reliability Approach of Continuous Digital Light Processing (cDLP) of Isosorbide Scaffolds: A New Material for Resorbable Medical Devices In this example, isosorbide was mixed with different amount of photoinitiator, co-crosslinker and solvent to form five 3D printable resin formulations. Isosorbide polymer was mixed using 56% w/w of the resin by weight. VIM (1-vinylimidazole), (Sigma-Aldrich, MO) was used as co-crosslinker at a 32% w/w; as well as 3% Irgacure 819 (BAPO) (BASF, NJ) as photoinitiator and dissolved in ethyl acetate as the solvent at 7% w/w. Isosorbide polymer was mixed and stirred overnight in a sealed container. HMB (Oxybenzophenone) (Sigma, St. Louis, MO) was added to act as well as a light attenuator (reducing thin film thickness). Cure tests were repeated at 30, 60, 90 and 120 seconds, measured utilizing the same method as described above for the thin film curing. Resin formulations that exhibit thin films thicknesses of 150-250 μm can be 3D printed without an attenuator in an EnvisonTEC® μicro® printer. An inverted stepped solid cylinder (FIG. 11) was used as a specimen to measure the breaking load of the resin as a surrogate for green strength. These 3D printed resin mixtures, Iso 1 (2.1% HMB 4% BAPO) and Iso 2 (3.5% HMB 5% BAPO), were investigated by using a load sensor that holds the build platform. The cure thickness was assessed by adding HMB as a photo-attenuator. 3D printing and tensile green strength was assessed for the resin formulations. This also shows that the resin can be properly printed by joining the layers during the cDLP. FIGS. 12, 13, 14A-14F, 15A-15C, 16A-16C, 17A-17C, and 18A-18C show the results of these studies.

Isosorbide provides a material that has appropriate green tensile strength, and this characteristic can aid in providing uses for the material as scaffolding and other medical devices to be implanted. For that purpose, continuous Digital Light Processing was used for projection of UV light. 3D printing, also referred to as additive manufacturing, opens the possibility of controlling both mechanical properties and the geometry. The addition of isosorbide as a photocrosslinkable, resorbable, and biocompatible material being able to be manufactured, to a high level of accuracy while being biocompatible and, hypothetically, resorbable in the window expected a medical implant, such as a bone substitute material, to be in the body.

The compositions, devices, systems, and methods of the appended claims are not limited in scope by the specific compositions, devices, systems, and methods described herein, which are intended as illustrations of a few aspects of the claims. Any compositions, devices, systems, and methods that are functionally equivalent are intended to fall within the scope of the claims. Various modifications of the compositions, devices, systems, and methods in addition to those shown and described herein are intended to fall within the scope of the appended claims. Further, while only certain representative compositions, devices, systems, and method steps disclosed herein are specifically described, other combinations of the compositions, devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A photocrosslinkable resin composition comprising a polyester and a photocrosslinker;
   wherein the polyester comprises (i) monomer units derived from a sugar-based bicyclic diol; (ii) monomer units derived from an unsaturated aliphatic diacid; and (iii) monomer units derived from a saturated aliphatic diacid;
   wherein the sugar-based bicyclic diol comprises a bicyclic diacetalized hexitol; and
   wherein the monomer units derived from the unsaturated aliphatic diacid are present in an amount of from greater than 0 mole % to 40 mole % of the polyester.

2. The resin composition of claim 1, wherein the polyester comprises from 25% by weight to 95% by weight of the resin composition.

3. The resin composition of claim 1, wherein the photocrosslinker comprises a biocompatible photocrosslinker.

4. The resin composition of claim 1, wherein the photocrosslinker comprises a bisacylphosphine oxide.

5. The resin composition of claim 1, wherein the resin composition further comprises a solvent.

6. The resin composition of claim 1, wherein the resin composition further comprises a co-crosslinker.

7. The resin composition of claim 6, wherein the co-crosslinker comprises 1-vinylimidazole, N-isopropylacrylamide, maleic anhydride, N-vinylpyrrolidone, or a combination thereof.

8. The resin composition of claim 6, wherein the co-crosslinker comprises a sugar-based co-crosslinker defined by Formula I or Formula II below

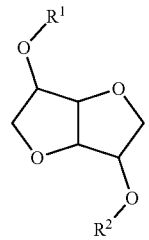

Formula I

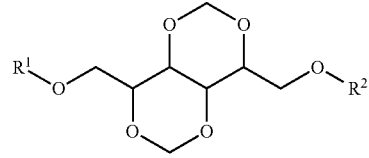

Formula II wherein $R^1$ and $R^2$ are each independently selected from H, C1-C6 alkyl, and an ethylenically unsaturated moiety, with the proviso that at least one of $R^1$ and $R^2$ is an ethylenically unsaturated moiety.

9. The resin of claim 8, wherein the co-crosslinker is defined by Formula IA, Formula IB, or Formula IC

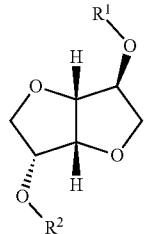

Formula IA

Formula IB

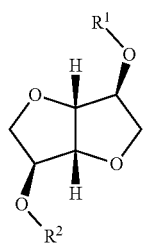

Formula IC

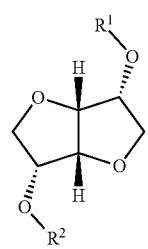

wherein $R^1$ and $R^2$ are each independently selected from H, C1-C6 alkyl, and an ethylenically unsaturated moiety, with the proviso that at least one of $R^1$ and $R^2$ is an ethylenically unsaturated moiety.

10. The resin of claim 8, wherein $R^1$ and $R^2$ are each independently selected from H, C1-C6 alkyl, and an ethylenically unsaturated moiety selected from vinyl, allyl, acryloyl, and methacryloyl, with the proviso that at least one of $R^1$ and $R^2$ is an ethylenically unsaturated moiety.

11. The resin of claim 10, wherein the co-crosslinker comprises one or more of the following

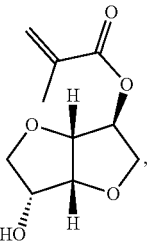

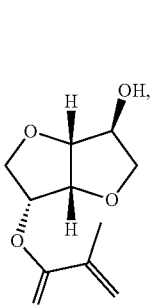

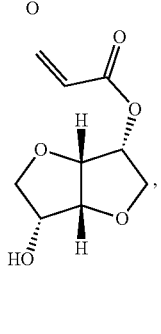

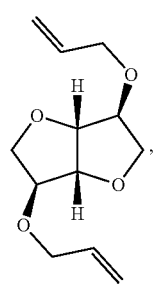

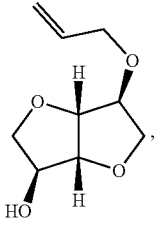

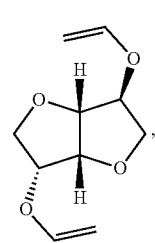

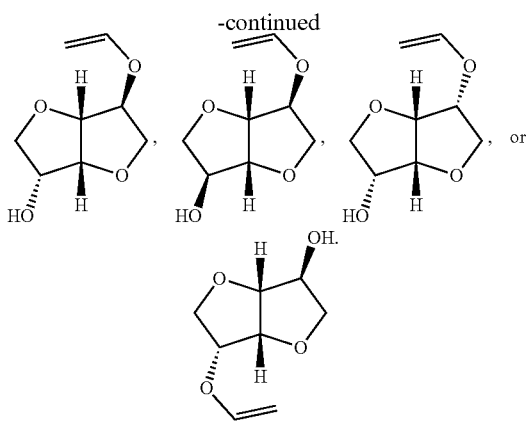

12. The resin of claim 8, wherein the co-crosslinker is defined by Formula IIA or Formula IIB

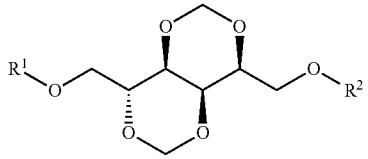

Formula IIA

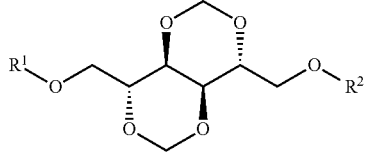

Formula IIB wherein $R^1$ and $R^2$ are each independently selected from H, C1-C6 alkyl, and an ethylenically unsaturated moiety, with the proviso that at least one of $R^1$ and $R^2$ is an ethylenically unsaturated moiety.

13. The resin composition of claim 1, wherein the resin composition further comprises a surface functionalization agent.

14. The resin composition of claim 1, wherein the resin composition further comprises a dye.

15. A method of forming an object via additive manufacturing, the method comprising:
  irradiating a first quantity of a resin composition of claim 1 on a substrate to induce photocrosslinking into a first layer on the substrate; and
  forming at least one additional layer on the first layer by irradiating at least a second quantity of the resin composition of claim 1 to induce photocrosslinking into the at least one additional layer on the first layer, thereby forming the object.

16. A method of manufacturing a three-dimensional object, the method comprising:
  receiving data representing at least the three-dimensional object at a Digital Light Processing (DLP) additive manufacturing apparatus including a Digital Micromirror Device (DMD);
  actuating the DMD to project light corresponding to layers of the three-dimensional object onto a transparent or translucent plate above which is disposed a build plate and a resin composition of claim 1; and
  shifting the build plate at selected increments such that the projected light sequentially causes the polyester within regions of the resin composition to at least partially photocrosslink to substantially resemble the layers of the three-dimensional object.

17. A process for continuous digital light processing (cDLP) manufacturing of a three-dimensional object, the process comprising:
  providing an additive manufacturing apparatus including a Digital Micromirror Device (DMD) and a transparent or translucent plate;
  providing a resin composition of claim 1;
  depositing an amount of the resin composition above the transparent or translucent plate;
  actuating the DMD to expose at least some amount of the resin composition to light to at least partially crosslink the polyester therein to form a layer of the three-dimensional object;
  actuating the DMD to expose at least some additional amount of the resin composition to light to at least partially crosslink the polyester therein to form an additional layer of the three-dimensional object and to at least partially overcure at least some of a previous layer to cause at least some interlayer binding between the previous layer and the additional layer; and
  repeating the actuating the DMD step to expose at least some additional amount of the resin composition a number of times as necessary to physically render the three-dimensional object layer by layer.

18. The resin composition of claim 1, wherein the monomer units derived from the sugar-based bicyclic diol are present in an amount of from 10 mole % to 50 mole % of the polyester.

19. The resin composition of claim 1, wherein the sugar-based bicyclic diol further comprises a dianhydrohexitol.

20. The resin composition of claim 19, wherein the dianhydrohexitol is chosen from isosorbide, isoidide, isomannide, and combinations thereof.

21. The resin composition of claim 1, wherein the bicyclic diacetalized hexitol is chosen from 2,4:3,5-di-O-methylene-D-mannitol (Manx-diol), 2,4:3,5-di-O-methylene-D-glucitol (Glux-diol), and combinations thereof.

22. The resin composition of claim 1, wherein the monomer units derived from the ethylenically unsaturated aliphatic diacid are present in an amount of from greater than 0 mole % to 35 mole % of the polyester.

23. The resin composition of claim 1, wherein the unsaturated aliphatic diacid comprises an $\alpha,\beta$-ethylenically unsaturated diacid.

24. The resin composition of claim 1, wherein the unsaturated aliphatic diacid is chosen from fumaric acid, maleic acid, chloromaleic acid, itaconic acid, methylglutaric acid, mesaconic acid, citraconic acid, and combinations thereof.

25. The resin composition of claim 1, wherein the unsaturated aliphatic diacid is fumaric acid.

26. The resin composition of claim 1, wherein the saturated aliphatic diacid comprises from 4 to 12 carbon atoms.

27. The resin composition of claim 1, wherein the saturated aliphatic diacid is chosen from adipic acid, suberic acid, sebacic acid, or a combination thereof.

28. The resin composition of claim 1, wherein the polyester further comprises monomer units derived from one or more additional diols, monomer units derived from one or more additional diacids, or a combination thereof.

29. The resin composition of claim 1, wherein the polyester is substantially free of aromatic monomer units.

30. The resin composition of claim 1, wherein the polyester has a number average molecular weight of less than 100,000 Da.

31. The resin composition of claim 1, wherein the polyester has a polydispersity index (PDI) of less than 5 or less than 4 .

32. The resin composition of claim 1, wherein the polyester comprises (i) from 40 mole % to 50 mole % monomer units derived from sugar-based bicyclic diol; (ii) from greater than 0 mole % to 20 mole % monomer units derived from an unsaturated aliphatic diacid; and (iii) from 30 mole % to 50 mole % monomer units derived from a saturated aliphatic diacid.

* * * * *